(12) United States Patent
Clark et al.

(10) Patent No.: US 9,736,913 B2
(45) Date of Patent: Aug. 15, 2017

(54) SOLID STATE LIGHTING FIXTURES WITH INTEGRATED WIRELESS CONTROL

(71) Applicant: Hubbell Incorporated, Shelton, CT (US)

(72) Inventors: Adam Joseph Clark, Bradenton, FL (US); Perry Romano, Bradenton, FL (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 14/725,754

(22) Filed: May 29, 2015

(65) Prior Publication Data

US 2015/0351205 A1 Dec. 3, 2015

Related U.S. Application Data

(60) Provisional application No. 62/005,820, filed on May 30, 2014.

(51) Int. Cl.
| | |
|---|---|
| *H05B 37/02* | (2006.01) |
| *H05B 33/08* | (2006.01) |
| *F21S 8/00* | (2006.01) |
| *F21Y 105/16* | (2016.01) |
| *F21Y 115/10* | (2016.01) |

(52) U.S. Cl.
CPC ............ *H05B 37/0272* (2013.01); *F21S 8/00* (2013.01); *H05B 33/0803* (2013.01); *H05B 33/0845* (2013.01); *H05B 33/0854* (2013.01); *H05B 37/0227* (2013.01); *H05B 37/0281* (2013.01); *F21Y 2105/16* (2016.08); *F21Y 2115/10* (2016.08); *Y02B 20/42* (2013.01)

(58) Field of Classification Search
CPC    H05B 37/02; H05B 37/0272; H05B 37/0281; H05B 37/0227; H05B 33/08; H05B 33/0803; H05B 33/0845
USPC ....... 315/149, 152, 246, 291, 294, 307, 308, 315/312
See application file for complete search history.

(56) References Cited

U.S. PATENT DOCUMENTS

| | | | |
|---|---|---|---|
| 5,848,054 A | 12/1998 | Mosebrook et al. | |
| 6,078,148 A | 6/2000 | Hochstein | |
| 8,319,452 B1 * | 11/2012 | Hamel | H05B 37/029 315/291 |
| 2004/0105264 A1 | 6/2004 | Spero | |
| 2004/0122930 A1 * | 6/2004 | Pasternak | H04L 12/2602 709/223 |
| 2010/0117545 A1 | 5/2010 | Kelly et al. | |

(Continued)

FOREIGN PATENT DOCUMENTS

WO    2014001987 A2    1/2014

OTHER PUBLICATIONS

PCT International Search Report and Written Opinion dated Sep. 1, 2015 from corresponding Application No. PCT/US15/33189, 11 pages.

*Primary Examiner* — Thai Pham
(74) *Attorney, Agent, or Firm* — Dilworth IP LLC

(57) ABSTRACT

A Solid State Lighting fixture (SSL fixture) for illuminating a desired area, includes an SSL light engine having a plurality of SSL elements that can be activated or dimmed in response to set time and date schedules to illuminate the desired area and a wireless module integrated with the SSL light engine and used for communicating with a remote controller using a wireless network.

18 Claims, 39 Drawing Sheets

(56) References Cited

U.S. PATENT DOCUMENTS

2010/0327766 A1\* 12/2010 Recker .................... H02J 9/02
  315/291
2014/0139116 A1   5/2014 Reed \* cited by examiner

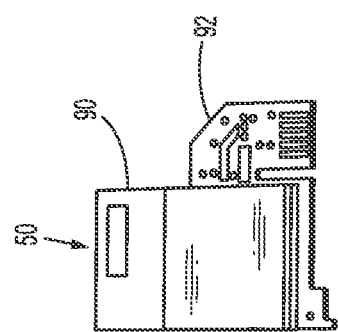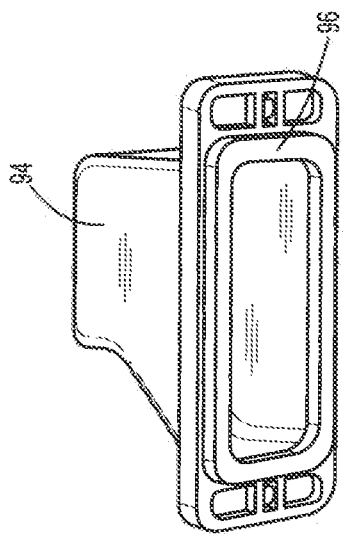
FIG. 12

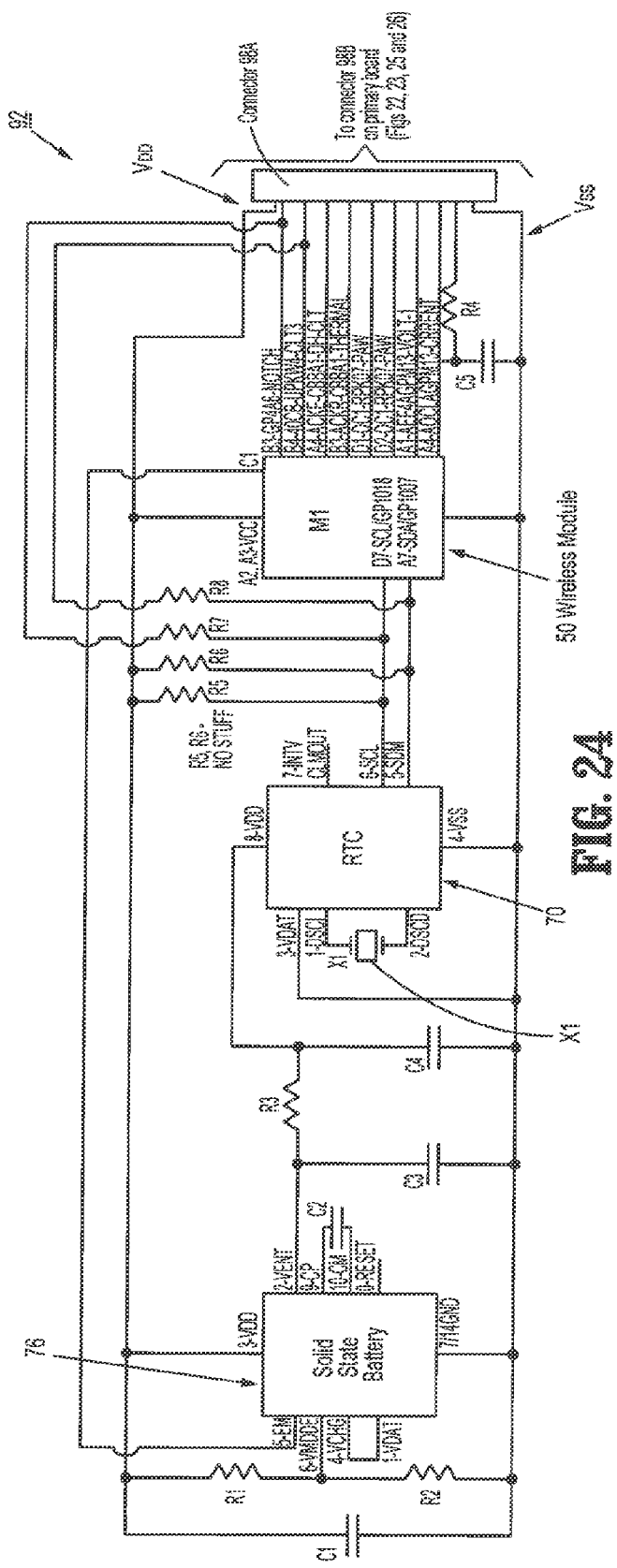
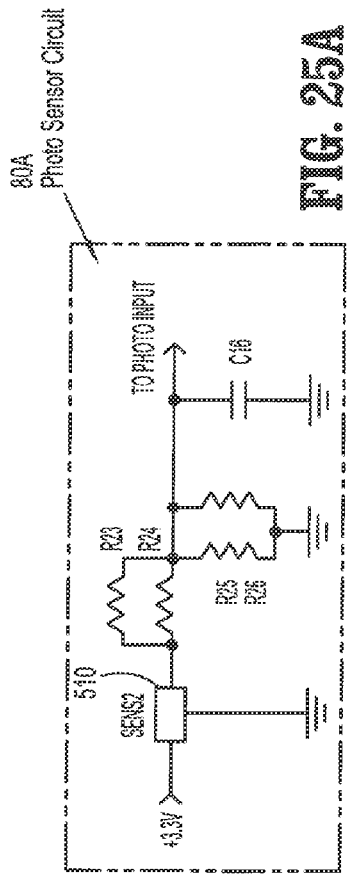
FIG. 24
FIG. 25A

BEACONNECT - Detect Nearby Fixtures

Detected Fixtures

| ID # ADDRESS | NAME | MODEL # | LINK QUALITY | | |
|---|---|---|---|---|---|
| 5DE6EE | BARE NODE SET 3 | | -49 dB | Flash | Configure |
| 5DE4A9 | BARE NODE SET 3 | | -50 dB | Flash | Configure |
| 5DE418 | Test Node | | -52 dB | Flash | Configure |
| 5DE434 | None | | -57 dB | Flash | Configure |
| 5DE49A | None | | -60 dB | Flash | Configure |

Alternative Network Settings

Network ID:     Channel:     Encryption Key:

☐ Show Only Fixtures Not Already on Network

DETECT

# SOLID STATE LIGHTING FIXTURES WITH INTEGRATED WIRELESS CONTROL

REFERENCE TO RELATED APPLICATION

This application claims priority to U.S. Provisional Application No. 62/005,820, filed on May 30, 2014, entitled "SSL LIGHT FIXTURES WITH INTEGRATED WIRELESS CONTROL", which is incorporated herein in its entirety by reference.

BACKGROUND

Field

The present disclosure relates to solid state lighting and, more specifically, to solid state lighting light fixtures with integrated wireless control.

Description of the Related Art

Luminaires (light fixtures) utilizing light emitting diodes (LEDs) have in recent years become practical from the standpoint of cost, efficiency, durability, etc. For example, such luminaires have penetrated the lighting market to some degree due to the increasing luminous efficacy of commercially available LED components. LED luminaires are desirable as they offer customers energy savings due to good luminous efficacy combined with the ability to precisely control light distribution patterns, which is of particular importance for outdoor lighting scenarios. Another benefit of LED luminaires is that with the right control mechanism the LEDs are controllable. Each LED luminaire can start-up (i.e., illuminate) on a near-instantaneous basis, and may be dimmed to any level by varying the current to each LED via dimming power supplies, e.g. drivers, that offer dimming leads accepting the standard 0-10V input format.

Further energy savings of LED luminaires can be realized by providing light only where and when needed. For example, LED luminaires can be dimmed or turned off until motion is detected in an area. The LED luminaires can also be dimmed according to a time of day, or set to illuminate at full brightness from dusk through midnight or another time, and then dimmed, saving energy, but still providing an acceptable level of lighting for overnight security purposes. Selective dimming or on/off operation of LED luminaires also slows lumen depreciation and extends the service life of the LED luminaires.

Non-wireless or non-remote-control devices have been developed for LED luminaires to capitalize on the above-noted potential for energy savings. Motion sensors, or timing devices have been hard-wired into LED luminaires and may be set through manually controlled switches, e.g., DIP switches. Microprocessors programmed through a hand-held device via a wired connection, have also been used. Such hard-wired control devices are relatively inexpensive to manufacture, but on the fly changes to the LED luminaire settings are prohibitively laborious due to the need to manually change the hard-wired DIP switches or to establish a physical wired connection to each LED luminaire, resulting in no real cost savings. Other LED luminaire control devices run dimming leads from each LED luminaire to a central control panel. However, such central control panels are more complicated from a wiring perspective, typically requiring separate conduits for low voltage wiring, which makes them especially cumbersome for retrofit applications.

Wireless control devices have also been developed for LED luminaires. Such wireless control devices generally consist of a control module and an antenna within each luminaire, and one or more external computers that allow users to control the luminaires from the external computers that interface to the luminaires.

However, currently available wireless lighting control devices typically suffer from distinct drawbacks. One such drawback is high cost sufficient to negate significant market penetration. Currently available wireless lighting control devices sell for over $100 per luminaire as charged by the control device manufacturer, which means the final sale price by the fixture OEM is significantly higher. Further, there are additional costs associated with the external "access points" needed to control the luminaires, which typically runs in the hundreds of dollars. Further, current wireless lighting control devices are typically complex to configure to specific site requirements for actual use of LED luminaires in the field. Configuring such LED luminaires requires professional field service personnel to go out into the field and configure the LED luminaires for the desired operational parameters, which comes at substantial cost to the customer. Another drawback is that currently available wireless lighting control devices are not self-contained within the luminaire such that they utilize external access points to set programmed schedules, and send commands to the individual luminaires to change illumination. Should the external computers fail, or wireless communications be impeded, the wireless lighting control device would fail to operate as intended. Another drawback is that the integration of a third party wireless lighting control device may not be specifically anticipated in the original design of an LED luminaire, complicating the manufacturing process, increasing the potential for a lower quality finished product, and increasing fabrication costs.

BRIEF SUMMARY

A Solid State Lighting fixture (SSL fixture) for illuminating a desired area, includes an SSL light engine having a plurality of SSL elements that can be activated or dimmed in response to set time and date schedules to illuminate the desired area and a wireless module integrated with the SSL light engine and used for communicating with a remote controller using a wireless network.

A Solid State Lighting fixture (SSL fixture) for illuminating a desired area, includes an SSL light engine having a plurality of SSL elements that can be activated or dimmed in response to set time and date schedules to illuminate the desired area and a wireless module integrated with the SSL light engine and used for communicating with a remote controller using a wireless network, wherein the wireless module controls the SSL fixture in response to commands from the remote controller.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 12 illustrates an embodiment of the wireless module and an enclosure for protecting the wireless module when mounted to the SSL light engine;

FIG. 24 is a circuit diagram of the wireless module according to an embodiment of the present disclosure mounted on a secondary board;

FIGS. 25A-25C depict a circuit diagram of the primary board according to an embodiment of the present disclosure, with photo sensing and motion sensing circuits;

FIG. 27 is an embodiment of a screen display of detected SSL fixtures in the SSL system according to the present disclosure;

FIG. 28 is an embodiment of a screen display for configuring a SSL fixture in the SSL system according to the present disclosure;

FIG. 29 is an embodiment of a screen display for configuring an illumination schedule for a SSL fixture in the SSL system according to the present disclosure;

DETAILED DESCRIPTION

Figure 1:
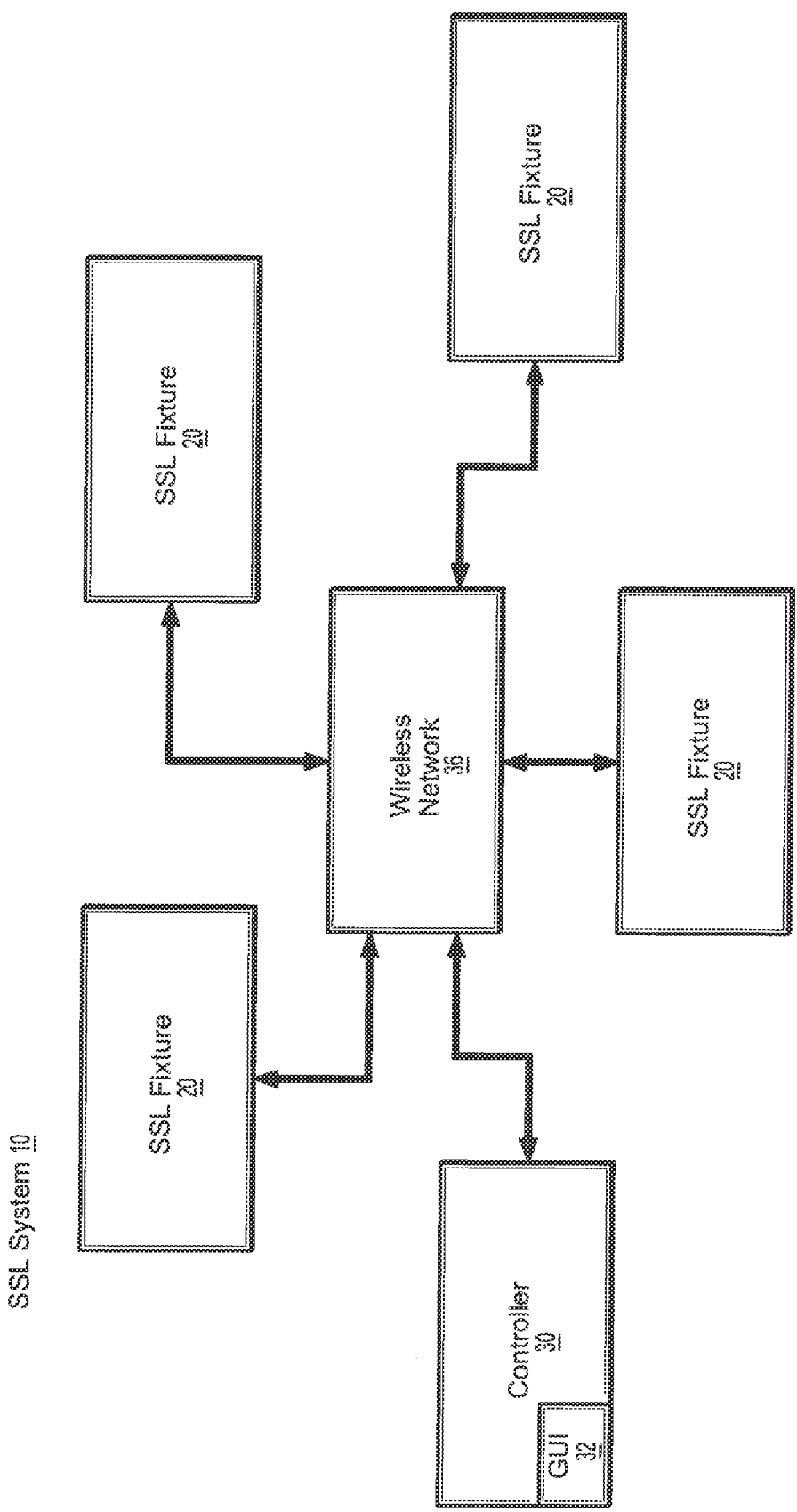
FIG. 1 is a block diagram of an embodiment of the SSL system according to the present disclosure.

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

The present disclosure relates to solid state lighting systems (SSL systems) that overcome the drawbacks described above, and can be controlled wirelessly to establish a lighting paradigm that independently activates and deactivates or adjusts (i.e., dims) the illumination of each solid state lighting fixture (SSL fixture) depending upon certain conditions, such as the time of day, or motion through an active region. In one embodiment the SSL system includes one or more SSL fixtures that can be arranged to illuminate a desired area. Each SSL fixture in this embodiment includes an SSL light engine and a wireless module mounted to the SSL light engine for communicating with a controller using a wireless network. The controller stores setting and identification information of each SSL fixture and is capable of sending information to each SSL fixture using the wireless network. In another embodiment, the SSL system includes one or more SSL fixtures that can be arranged to illuminate a desired area. Each SSL fixture includes an SSL light engine and a wireless module mounted to the SSL light engine for communicating with a controller using a wireless network. The controller stores setting and identification information of each SSL fixture and is capable of sending information to each SSL fixture using the wireless network. The wireless module interfaces with a real time clock for controlling at least in part the illumination of the SSL light engine in accordance with stored settings representing times of day and brightness. In another embodiment, the SSL system includes one or more SSL fixtures that can be arranged to illuminate a desired area. Each SSL fixture includes an SSL light engine and a wireless module mounted to the SSL light engine and used for communicating with a controller using a wireless network. The controller stores setting and identification information of each SSL fixture and is capable of sending information to each SSL fixture using the wireless network. The wireless module interfaces with a real time clock for controlling at least in part the illumination of the SSL light engine in accordance with stored settings representing times of day and brightness. A back-up energy storage device, preferably a back-up battery, supplies power to the real time clock in the event power to the fixture is lost. Loss of power may occur in the normal course of operation as power outages, or intentionally if the user cuts off power during a certain time interval such as daylight hours.

The present disclosure also provides an SSL fixture for illuminating a desired area. The SSL fixture includes a housing for installation in outdoor environments, an SSL light engine having a plurality of SSL elements that can be activated or dimmed in response to set time and date schedules to illuminate the desired area, wherein the SSL light engine is positioned within the housing such that the plurality of SSL elements can illuminate the desired area. A wireless module is mounted to the SSL light engine and used for communicating with a controller using a wireless network. The wireless module may also interface with a real time clock for controlling at least in part the illumination of the SSL light engine in accordance with stored settings representing times of day and brightness. A back-up battery may be provided to supply power to the real time clock in the event power to the fixture is lost.

Figure 2:
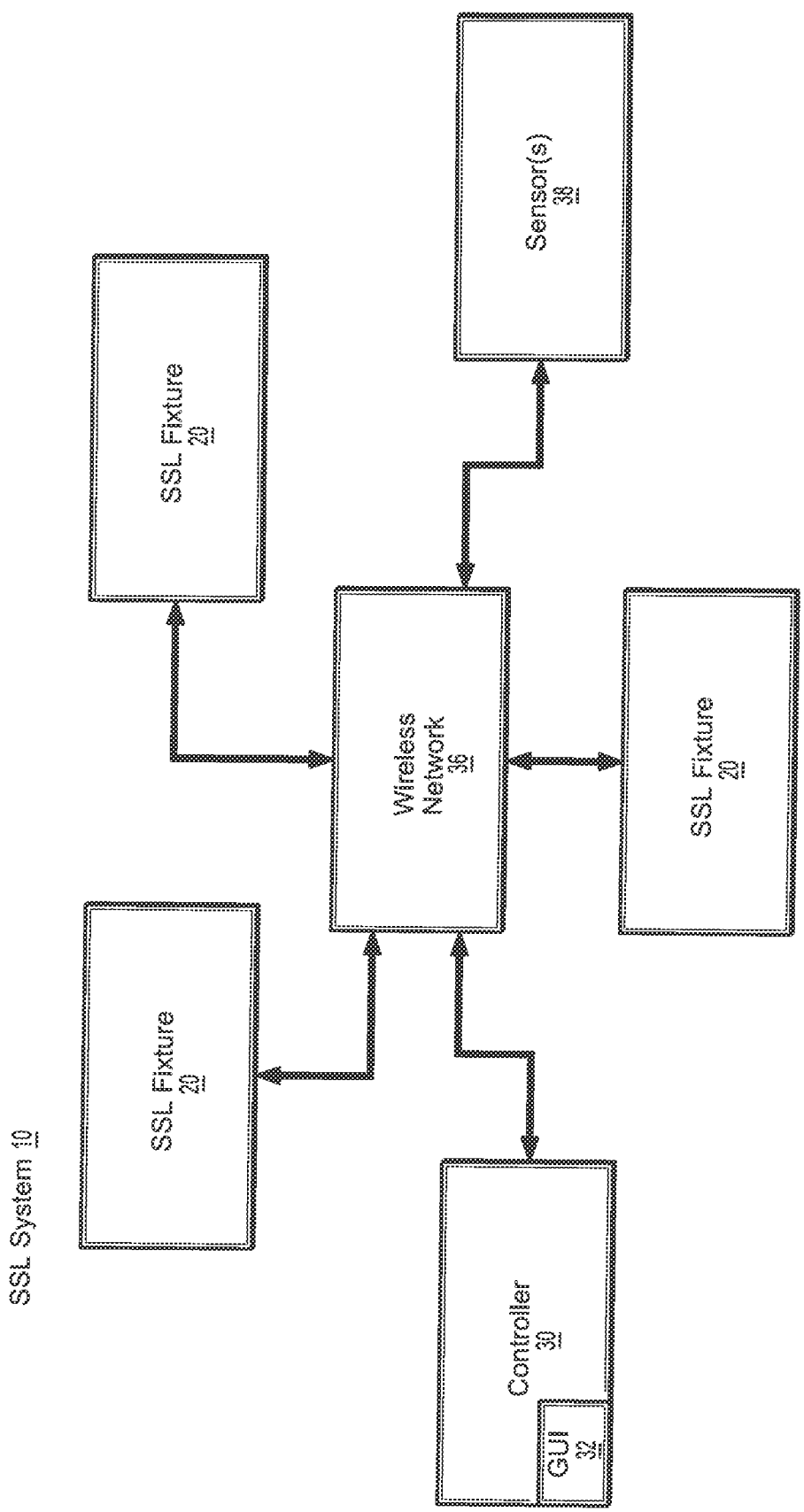
FIG. 2 is a block diagram of another embodiment of the SSL system according to the present disclosure.

Referring to FIGS. 1 and 2, an SSL system 10 according to an embodiment of the present disclosure includes at least one SSL fixture 20, a controller 30 that can be used to program or otherwise provide commands, instructions, or program code to each SSL fixture 20 and a wireless network 36 interconnecting each device within the SSL system 10. Preferably, the SSL system 10 includes a plurality of SSL fixtures 20, as shown in FIG. 1. FIG. 2 depicts another embodiment of the present disclosure including an SSL system 10 similar to the embodiment of FIG. 1, except the SSL system also includes one or more sensors 38. Sensors 38 may include, for example, one or more light sensors, and/or one or more motion sensors. According to an embodiment of the present disclosure, the sensors 38 may be located external to the SSL fixtures and used to control one or more SSL fixtures via the wireless network 36. According to another embodiment of the present disclosure, one or more sensors 38 are incorporated in one or more of the SSL fixtures 20.

Examples of suitable controllers 30 include personal computers, mobile computing devices, such as a smartphone or tablets, or dedicated fixed or portable computing devices capable of providing real-time control and/or programming of one or more SSL fixtures 20 used to illuminate a desired area. The controller 30 may communicate to the wireless network 36 through, for example, a bridge node. A non-limiting example of a suitable bridge node includes a USB wireless adapter, such as the SNAP Stick 200 USB dongle manufactured by Synapse. The wireless network 36 is preferably a mesh network. When communicating with individual SSL fixtures 20 outside the mesh network, SSL fixtures 20 can be controlled by the controller 30 when controller 30 is in close proximity to the SSL fixture 20 and using, for example, the USB wireless adapter (e.g., the SNAP Stick 200 USB dongle).

Communication between the nodes (e.g., controller 30, SSL fixture(s) 20, sensor(s) 38, etc.) on the wireless network 36 is achieved with a system having flexible addressing of the nodes, immunity to traffic storms, and efficient traffic throughput in a simple command and acknowledgement format. The SSL fixtures 20 and controller 30 transmit and receive data packets that may contain several pieces of information. The format of the data packets can vary between command packets (from controller 30 to SSL fixtures 20) or acknowledgement packets (from SSL fixtures 20 to controller 30). Command packets may include at least the following, 1) an address, which can be an address of one or more nodes, or group of nodes, 2) a command code, 3) arguments for the command, and 4) an ID code identifying the data packet. Acknowledgement packets may include at least the following, 1) the address of the node sending the data packet (and the node may append addresses of other nodes which are replying with the same information), and 2) confirmation codes for all commands received. The acknowledgement packets may also include diagnostic data in response to a diagnostic command from the controller 30. Data packets may also include a hop count, indicating the number of intermediate devices through which the data packet passes. A fixture 20 may also initiate a command packet, for example, to alter other fixtures' dimming levels upon detection of motion. A fixture initiated command packet might not require an acknowledgement packet, due to the non-criticality of an occasional missed packet. Finally, a fixture 20 whose RTC 70 has lost its time may initiate a packet to request the time and date information from a nearby fixture. The response packet causes all receiving fixtures not having the current time to update their RTCs 70, therefore these time recovery packets may use a simpler format which does not employ specific addresses and is limited to one hop.

Generally, to initiate communications, a user enters a command within a user interface program 32 which may include a graphic user interface (GUI) running on the controller 30, and instructs the controller 30 to broadcast the command through the wireless network 36. The command may be directed to one particular SSL fixture 20 or to a group of SSL fixtures 20. The user interface program 32 may also log the commands in a list of outstanding commands. One or more SSL fixtures 20 may be configured as a repeater. Any SSL fixture 20 that is configured as a repeater and receives a data packet may rebroadcast the command if the data packet has remaining hops as set by the user. SSL fixtures 20 may also be set as a repeater for their own group only, in which case the SSL fixture will rebroadcast the command to other SSL fixtures and any sensors 38 in that group. The SSL fixtures 20 maintain a queue of packet IDs received so the same packet is not retransmitted or executed twice, and the SSL fixture 20 will not retransmit or execute if the queue is full, thereby helping to minimize network traffic congestion. Once a command is received, the SSL fixture 20 executes the command if the SSL fixture 20 is included in the data packet's address string, or if the data packet is addressed to the group which includes the SSL fixture 20.

According to embodiments of the present disclosure, each SSL fixture 20 includes a wireless module 50 (described later below) for communicating with controller 30 via wireless network 36. For each of the embodiments described herein, the signals sent to the wireless module 50 by the controller 30, via the wireless network 36, may include generally, user commands. These user commands include but are not limited to dim fixture (which may include turning the SSL elements on and off), set schedule to automatically dim fixture, set sunrise or sunset times for astronomical time events which vary according to date, set fixture's group or name, or to set fixture's behavior upon one or more sensor responses. Acknowledgements and information requested by the controller 30 are sent from the SSL fixture(s) 20 to the controller 30 by the wireless module 50 via wireless network 36. This information may include diagnostic information from, for example, the status sensors 72, such as printed circuit board temperature; the number of kilowatt hours the SSL fixture has been operating; real-time clock (RTC) time; and other information reflecting that one or more SSL fixture components are not functioning properly and are in need of repair, such as RTC status, etc. Signals sent to the controller 30 from the SSL fixtures 20 by the wireless module 50 via wireless network 36 may also include acknowledgements that commands from the controller have been received. The SSL fixture 20 may include a real-time clock (RTC) which provides a suitably accurate clock to the SSL fixture 20 components to ensure dimming operations are performed at a desired time of day. Details of these components will be described further below.

Figure 33:
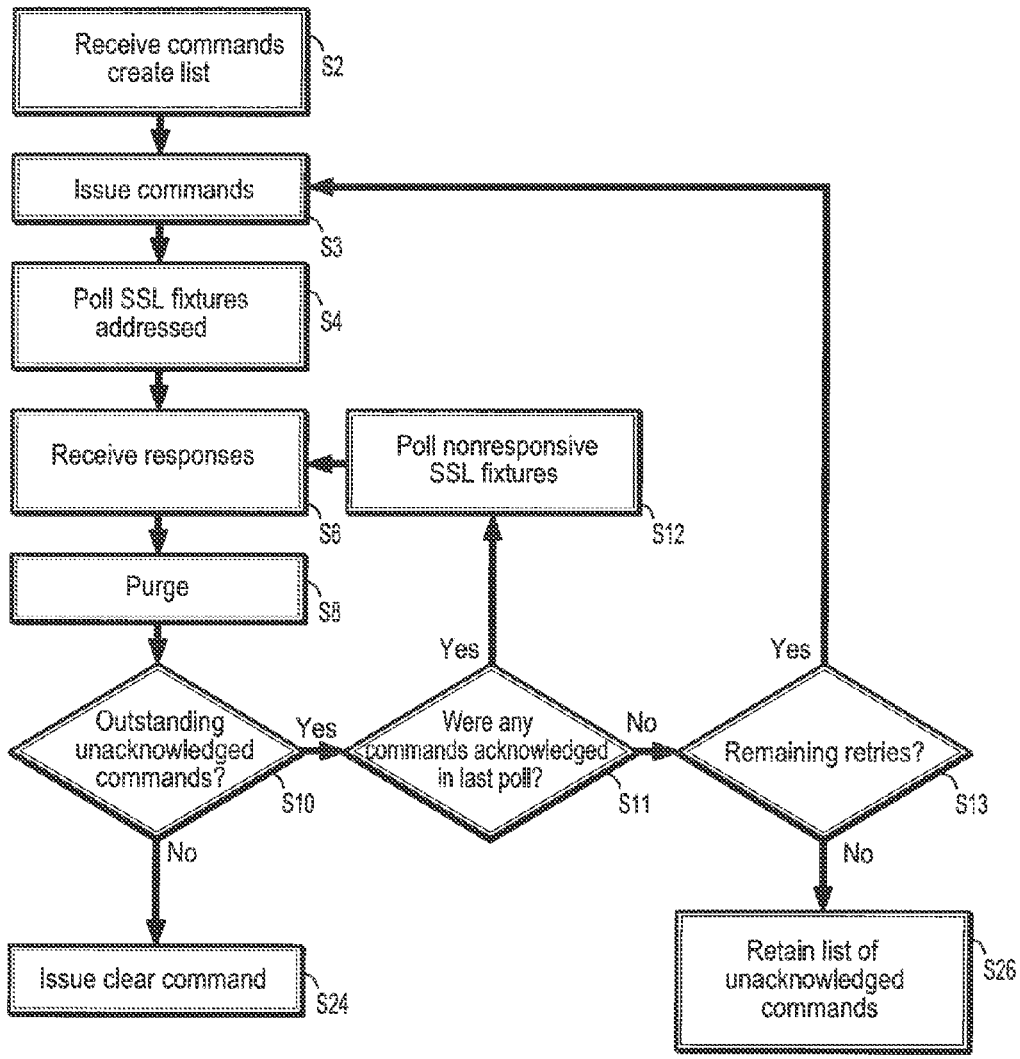
FIG. 33 is a flow chart for describing controller command issuance according to an embodiment of the present disclosure.

FIG. 33 depicts a flow chart according to an embodiment of the present disclosure for describing the flow of controller 30 command issuance. After the controller 30 receives commands and creates a list (STEP S2) controller 30 issues commands, which could be several commands in series (STEP S3), controller 30 then polls a subset or all SSL fixtures 20 addressed in finite groups (e.g., SSL fixtures 20 associated with 28 addresses) (STEP S4), for acknowledgement that the command was received. Controller 30 may alternatively configure the command packet to direct the fixture to automatically acknowledge without waiting for a unique poll packet. A polled SSL fixture 20 replies via an acknowledgement packet with its address and all stored command confirmation codes (STEP S6). The retransmit protocol for the acknowledgement packets is similar to command packets, with SSL fixtures 20 maintaining a queue of SSL fixtures 20 whose acknowledgements they have retransmitted. An SSL fixture 20 operating as a repeater will not retransmit for the same originating SSL fixture 20 twice during the same polling cycle. As the controller 30 receives the acknowledgement packets, controller 30 purges the corresponding outstanding commands from its list (STEP S8). If there are no outstanding unacknowledged commands (NO, STEP S10), controller 30 will proceed to close the command cycle (Step S24) as described below. A new polling cycle is initiated if there are any outstanding unacknowledged commands (YES, STEP S10) and if at least one command was acknowledged in the last poll (YES, Step S11). The new poll is addressed to fixtures which have failed to acknowledge previous polls or additional fixtures that have not yet been polled since the last command issuance (Step S12). The polling cycles are repeated until no additional commands have been acknowledged during the latest cycle (NO, STEP S11). If there are outstanding unacknowledged commands for which the controller 30 fails to get an acknowledgement on a poll, controller 30 will reissue the command but will address the command to the individual SSL fixtures 20 that have not acknowledged the command (STEP S3). Controller 30 will then commence one or more polling cycles (STEP S4, S12). When an acknowledgement is received (STEP S6), the corresponding outstanding command is purged from the list (STEP S8). If an acknowledgement is still not received from an SSL fixture 20, controller 30 may continue with additional retries. After a set number of consecutive failures, controller 30 will cease all communication attempts (NO, STEP S13), but keep the outstanding commands in queue in case a user prefers to try again (STEP S26). Controller 30 may maintain a record of which SSL fixture functions have been synchronized with the user interface program 32 for certain functions and which SSL fixtures 20 may need to be updated. If the above command-acknowledgement sequence is successful, the controller 30 will close the command cycle and issue a final clear command (STEP S24), which goes unacknowledged, to clear the communication queues in the SSL fixtures 20, readying them for another round of communications if necessary (STEP S24). According to an embodiment of the present disclosure, the SSL fixtures 20 may also automatically clear their own queues after a period of radio non-use, which may be any time period but is preferably set to one minute.

Figure 3:
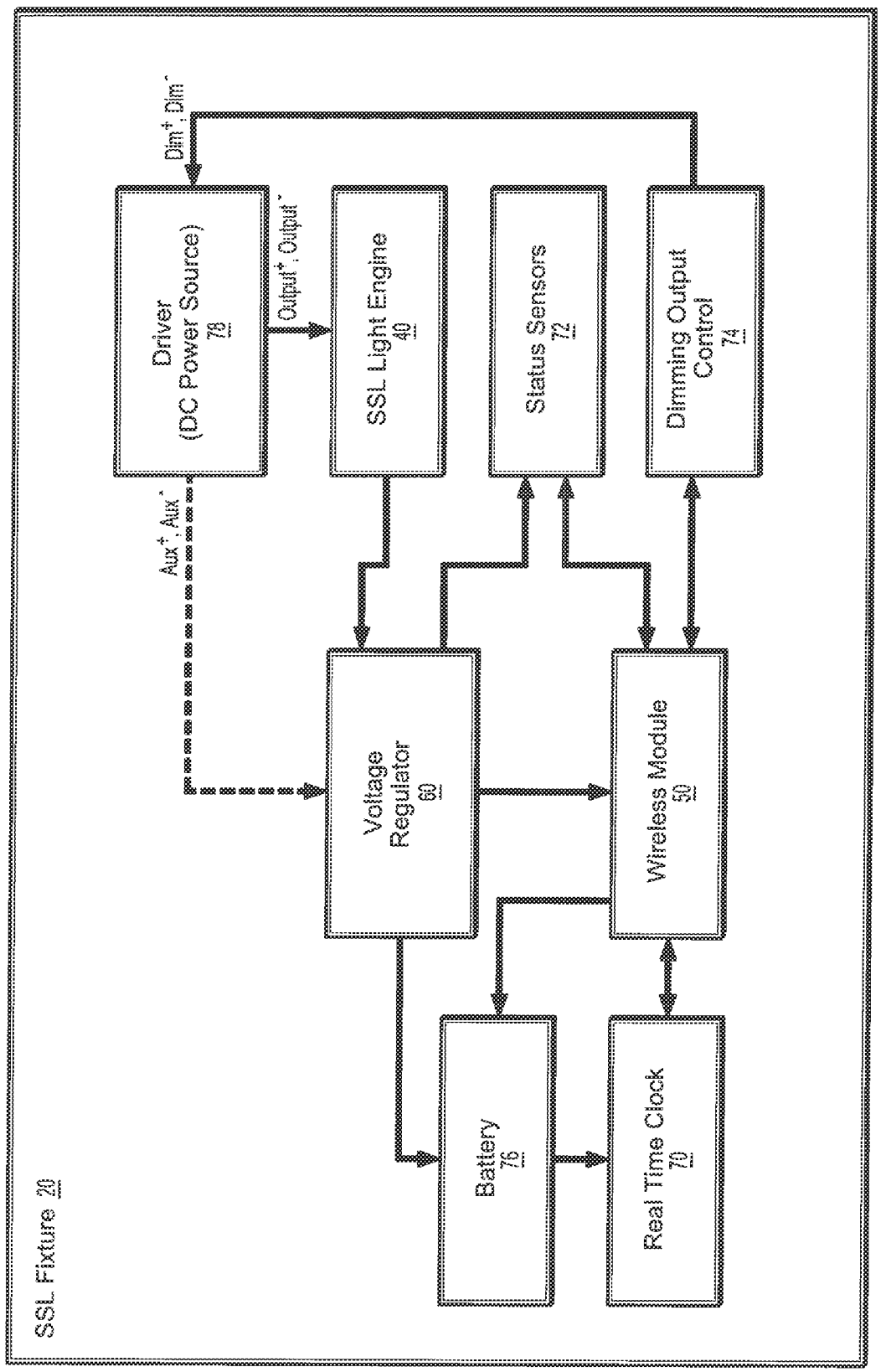
FIG. 3 is a block diagram of an embodiment of an SSL fixture according to the present disclosure.
Figure 4:
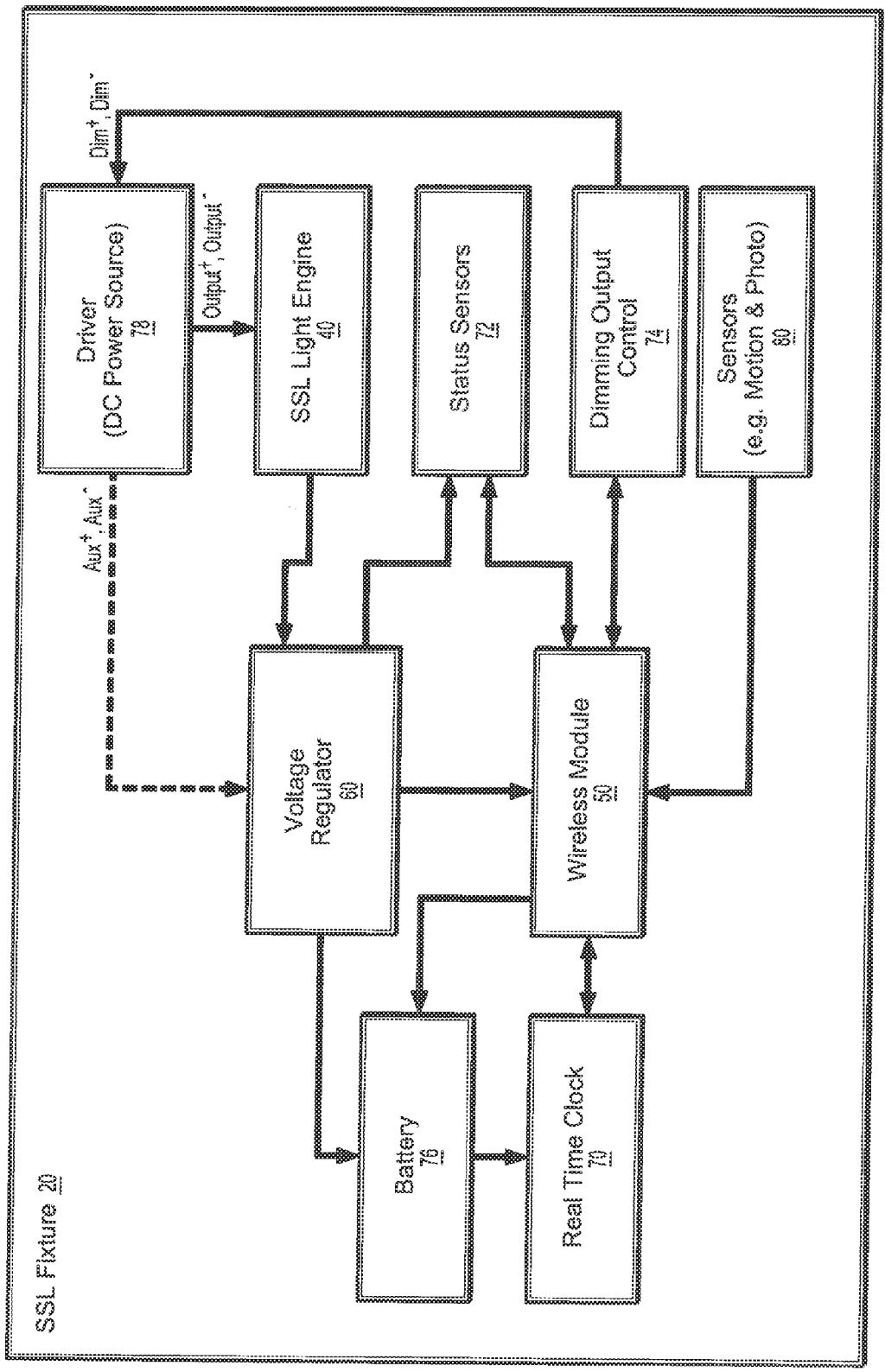
FIG. 4 is a block diagram of another embodiment of an SSL fixture according to the present disclosure with an on-board sensors.
Figure 5:
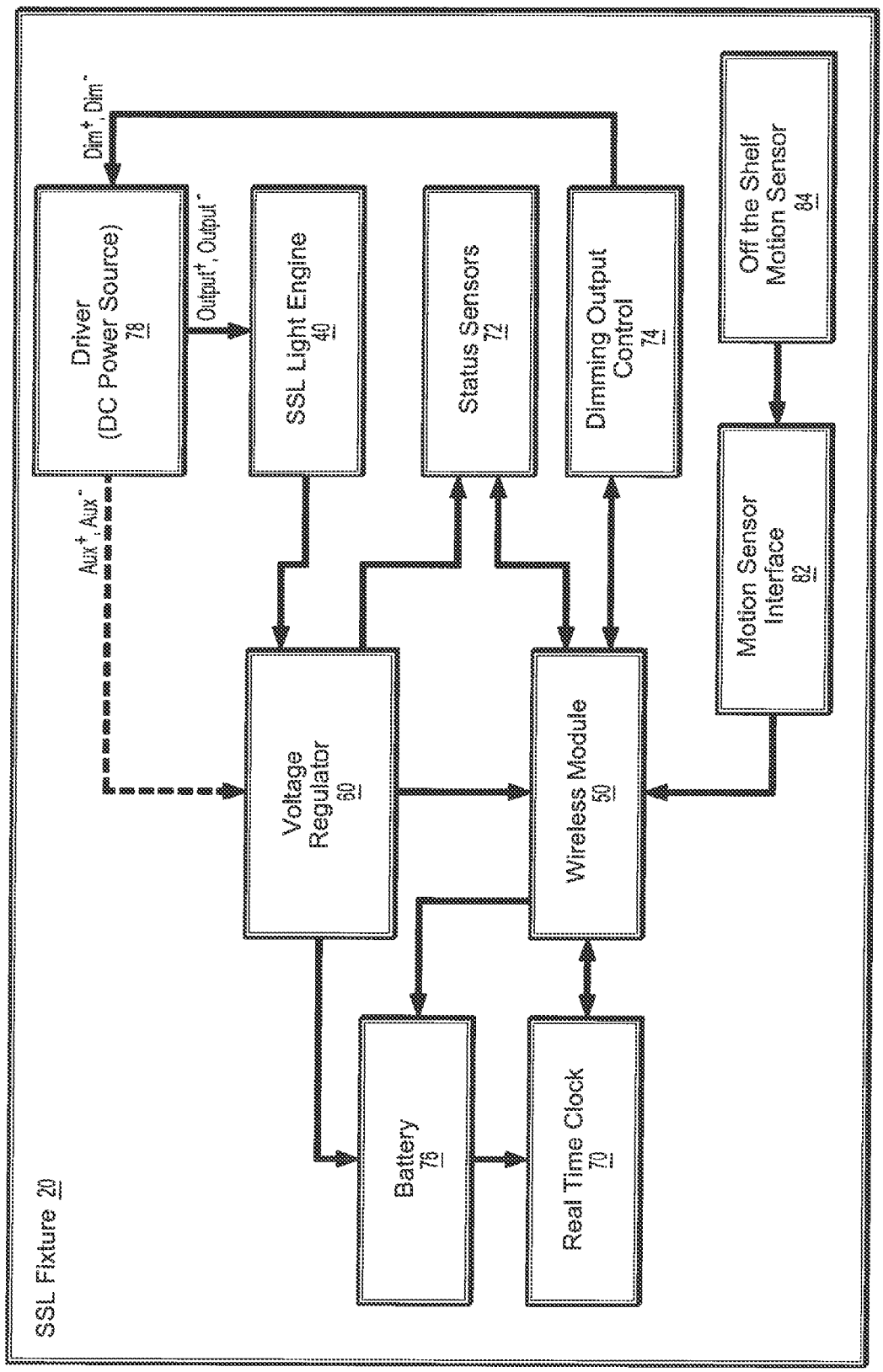
FIG. 5 is a block diagram of another embodiment of the SSL fixture according to the present disclosure with an external motion sensor.
Figure 34:
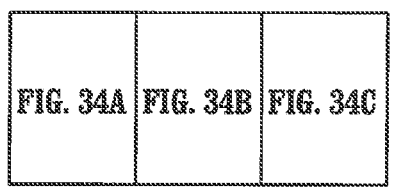
FIGS. 34A-34C depict a circuit diagram for an embodiment of a driver that may be used in the SSL fixture according to the present disclosure.
Figure 35:
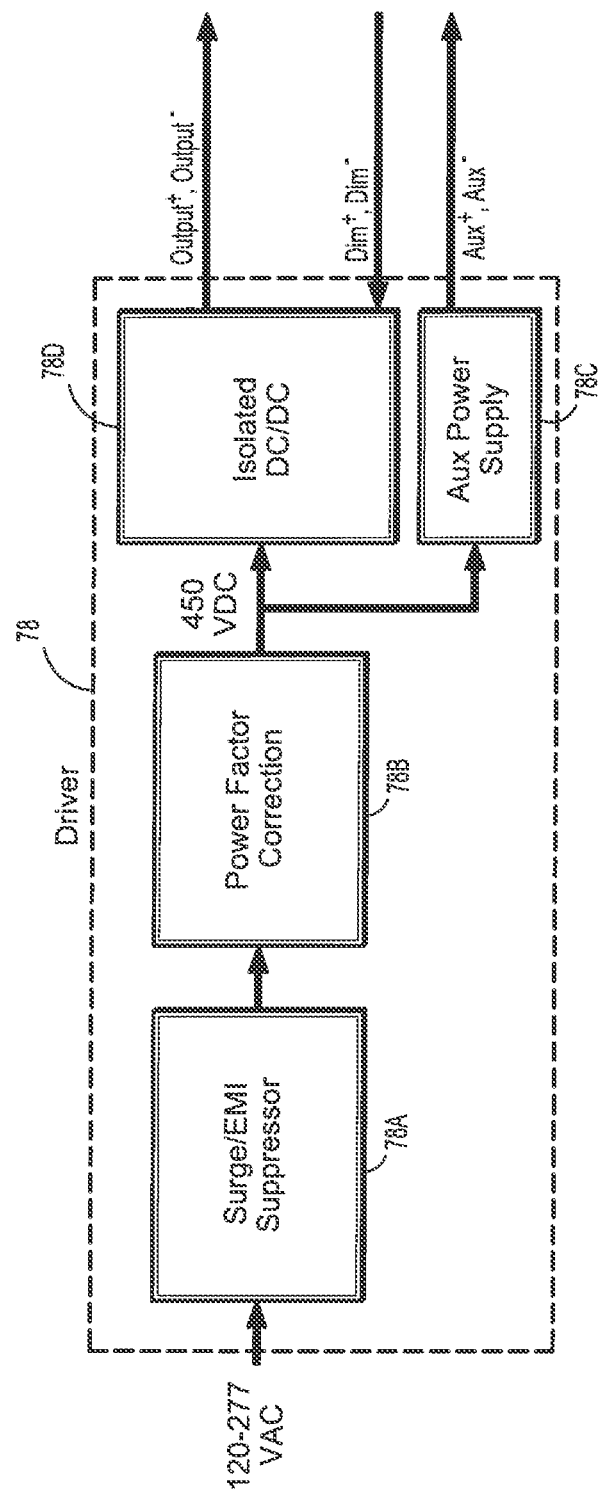
FIG. 35 is a block diagram of the driver of FIG. 34.

FIGS. 3-5 depict elements of an SSL fixture 20 according to various embodiments of the present disclosure. Referring to FIG. 3, an SSL fixture 20 according to an embodiment of the present disclosure includes an SSL light engine 40, a wireless module 50, a voltage regulator 60, a real-time-clock (RTC) 70, status sensors 72, dimming output control 74, battery back-up 76 and driver (or dc power supply) 78. The SSL light engine 40 illuminates when energized by driver 78, and can be dimmed or brightened depending upon the voltage applied to the driver dimming input by the SSL light engine 40 under the control of the dimming output control 74. According to an embodiment of the present disclosure, a suitable driver 78 is the PLED150W-042-C3500-D manufactured by Thomas Research Products. Another embodiment of a suitable driver 78 is shown in FIGS. 34 and 35 and will be described later below. Voltage regulator 60 maintains a constant voltage supply, e.g., 3.3 volts, for the wireless module 50. The status sensors 72 measure certain operating characteristics of the SSL fixture, and may include temperature sensors, and sensors to measure current and voltage (including voltage and current levels of signals Output+ and Output− which are inputs for driving SSL light Engine 40), etc. Measurements from the status sensors 72 can be transmitted to the controller 30 via wireless module 50, for example, in response to a diagnostic data request from controller 30. The battery back-up 76 supplies power to the RTC 70 when power is otherwise unavailable to the RTC 70. The battery back-up 76 enables the RTC 70 to maintain accurate time so that the wireless module 50 can perform scheduled operations without the need to reprogram the RTC 70 in the event of power interruption. Embodiments of detailed circuit diagrams to implement the components disclosed in FIG. 3 are provided in FIGS. 22, 23 and 24 which will be described later below.

Referring to FIG. 4, an SSL fixture 20 according to another embodiment of the present disclosure includes an SSL light engine 40, a wireless module 50, a voltage regulator 60, a real-time clock (RTC) 70, status sensors 72, dimming output control 74, battery back-up 76, driver (or dc power supply) 78 and one or more sensors 80, such as motion and light or photo sensors. The SSL light engine 40 illuminates when energized by driver 78, and can be dimmed or brightened depending upon the voltage applied to the driver dimming input by the SSL light engine 40 under the control of the dimming output control 74. An example of a suitable driver is the PLED150W-042-C3500-D manufactured by Thomas Research Products. Another example of a suitable driver is described below with reference to FIGS. 34 and 35. The wireless module 50 is configured to transmit signals to the controller 30 (seen in FIG. 1), and receive signals from the controller 30. Voltage regulator 60 maintains a constant voltage supply, e.g., 3.3 volts, for the wireless module 50. The status sensors 72 measure certain operating characteristics of the SSL fixture, and may include temperature sensors, and sensors to measure current and voltage (including voltage and current levels of signals Output+ and Output− which are inputs for driving SSL light Engine 40), etc. Measurements from the status sensors 72 can be transmitted to the controller 30 via wireless module 50. The battery back-up 76 supplies power to the RTC 70 when power is otherwise unavailable to the RTC 70. The battery back-up 76 enables the RTC to maintain accurate time so that the wireless module can perform scheduled operations without the need to reprogram the RTC in the event of power interruption. The motion and/or photo sensors 80 can be used to control activation, deactivation or adjustment (e.g., dimming) of one or more SSL fixtures 20 within the SSL system 10. Embodiments of detailed circuit diagrams to implement the components disclosed in FIG. 4 are provided in FIGS. 24 and 25 which will be described later below.

Referring to FIG. 5, an SSL fixture 20 according to another embodiment of the present disclosure includes an SSL light engine 40, a wireless module 50, a voltage regulator 60, a real-time clock (RTC) 70, status sensors 72, dimming output control 74, battery back-up 76, driver (or dc power supply) 78, and a motion sensor interface 82 in communication with an off the shelf motion sensor 84 which may or may not be enclosed within the SSL fixture 20. The SSL light engine 40 illuminates when energized, and can be dimmed or brightened depending upon the voltage applied to the driver dimming input by the SSL light engine 40 under the control of the dimming output control 74. An example of a suitable driver is the PLED150W-042-C3500-D manufactured by Thomas Research Products. Another example of a suitable driver is described below with reference to FIGS. 34 and 35. The wireless module 50 is configured to transmit signals to the controller 30 (seen in FIG. 1) and receive signals from the controller 30, via the wireless network 36. Voltage regulator 60 maintains a constant voltage supply, e.g., 3.3 volts, for the wireless module 50. The status sensors 72 are used to measure certain operating characteristics of the SSL fixture, and may include temperature sensors, and sensors to measure current and voltage (including voltage and current levels of signals Output+ and Output− which are inputs for driving SSL light Engine 40), etc. Measurements from the status sensors 72 are transmitted to the controller 30 via wireless module 50. The battery back-up 76 supplies power to the RTC 70 when power is otherwise unavailable to the RTC 70. The battery back-up 76 enables the RTC to maintain accurate time so that the wireless module can perform scheduled operations without the need to reprogram the RTC in the event of power interruption. In this embodiment, the motion sensor interface 82 is configured to interface with off the shelf motion sensors and provides signals to the wireless module and can be used to control activation, deactivation or adjustment of one or more SSL fixtures 20 within the SSL system. Embodiments of detailed circuit diagrams to implement the components disclosed in FIG. 5 are provided in FIGS. 24 and 26 which will be described later below. As an alternative method of motion sensor interface, the motion sensor, preferably having push-pull 0-10V output, may have its output wired to the DIM+ circuit through a resistor or other suitable component or circuit, such that a change in the output state results in a small shift in voltage level or other detectable fluctuation of the DIM+ voltage level. The wireless module 50 recognizes the change in DIM+ and responds appropriately.

Figure 20:
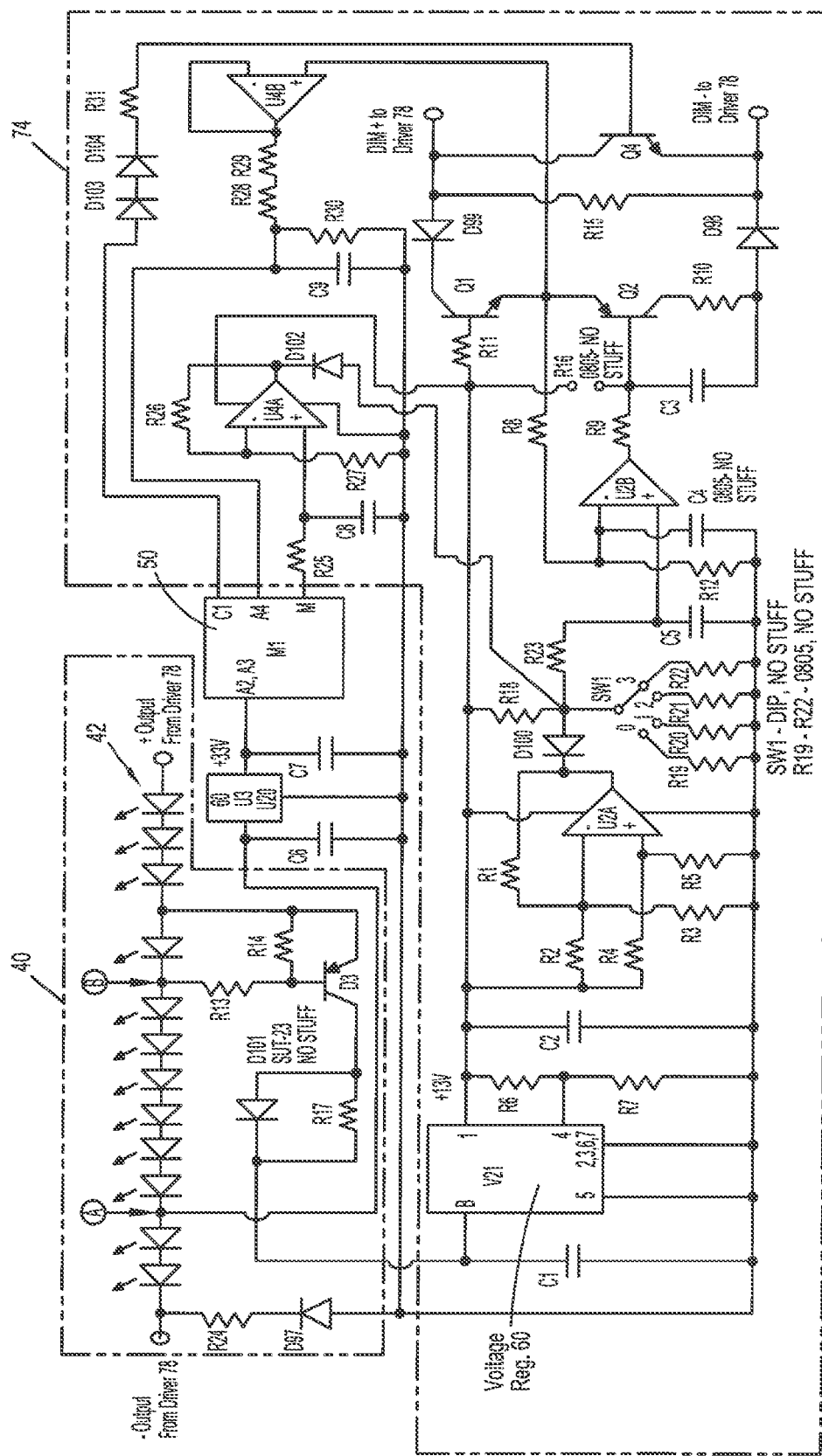
FIG. 20 is a circuit diagram of an embodiment of the SSL fixture according to the present disclosure, where the wireless module is integrated into the primary circuit board.

Various embodiments of circuit arrangements for implementing elements of the SSL fixture 20 will be described by reference to FIGS. 20-26. FIG. 20 depicts an SSL fixture 20 with wireless module 50, voltage regulator(s) 60, SSL light engine 40 and dimming output control 74 integrated into a primary circuit board. Voltage regulators 60 (U20, U21) provide power for driving wireless module 50 and dimming output control 74. Power for voltage regulator 60 (U20) is provided off of a tap A of the string of SSL elements 42. Power for voltage regulator 60 (U21) is provided off of one or more tap(s) B of the string of SSL elements 42 as shown. According to this embodiment, auxiliary power is not required since the wireless module 50 and dimming output control 74 are driven off of the string of SSL elements. However, with this embodiment, if SSL elements are extinguished or driven to 0% brightness, power would no longer be provided to the wireless module 50 or the dimming output control 74. Accordingly, if this embodiment is utilized, the SSL light engine 40 should not be driven below a value sufficient for providing power to those elements. Output+ and Output− from driver 78 (see FIGS. 34, 35) drive the SSL elements 42 as shown. Dimming output control 74 outputs PWM signals Dim+ and Dim− to driver 78 for controlling power to the SSL elements 42. Driver 78 (described later below) may be implemented on the same primary circuit board as the elements shown in FIG. 20 or may be implemented on a secondary circuit board including one or more connectors for providing electrical connection to the elements shown in FIG. 20.

Figure 21:
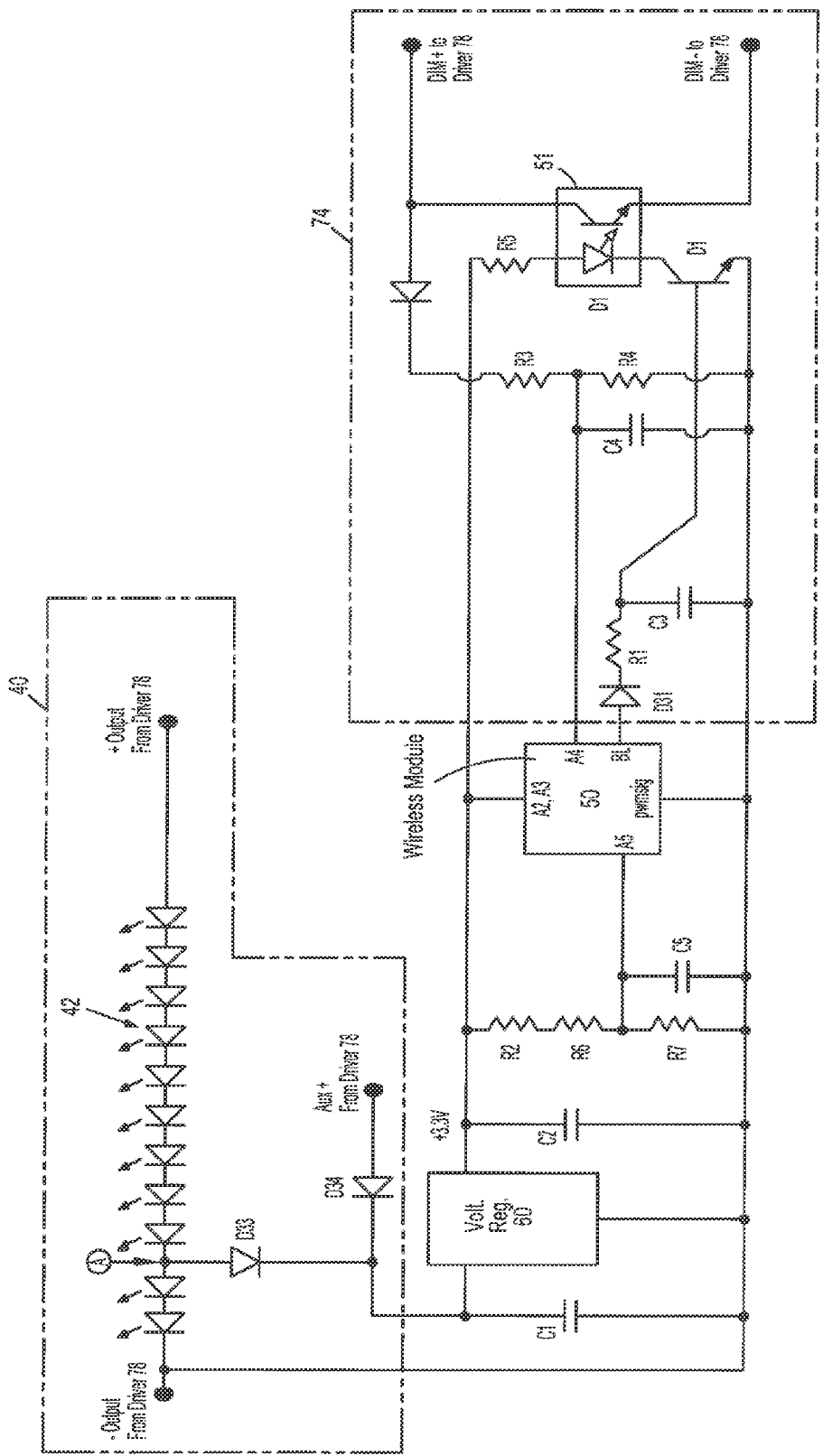
FIG. 21 is a circuit diagram of an another embodiment of the SSL fixture according to the present disclosure, where the wireless module is integrated into to the primary circuit board.

FIG. 21 depicts an SSL fixture 20 according to another embodiment of the present disclosure with wireless module 50, voltage regulators 60, SSL light engine 40 and dimming output control 74 integrated into a primary circuit board. The embodiment depicted in FIG. 21 provides a simplified circuit compared to that described above with respect to FIG. 20. Voltage regulator 60 provides regulated power to wireless module 50. Power for voltage regulator 60 is provided off of a tap A of the string of SSL elements 42. Output+ and Output− from driver 78 (see FIGS. 34, 35) drive the SSL elements 42 as shown. According to this embodiment, when driver 78 drives the SSL light engine 40 down to low dimming levels (low brightness), auxiliary power (Aux+) from driver 78 supplies power to the voltage regulator 60 so that wireless module 50 can keep operating. In this way, SSL elements 42 can be driven down to very low brightness and even 0% brightness and the wireless module 50 will still operate. Wireless module 50 outputs a pulse width modulated (PWM) signal PWMSIG to dimming output control 74. Dimming output control 74 outputs DC signals Dim+ and Dim− to driver 78 for controlling power to the SSL elements 42. Diode D31, resistor R1, capacitor C3 and base-emitter voltage Vbe of transistor Q1 condition signal PWMSIG and determine the driving current through optical isolator 51 which in turn determines the dimming voltage (DIM+ and DIM−) output to driver 78. The dimming input voltage DIM+ is sensed via voltage divider circuit R3, R4 and stability adding capacitor C4 and fed back to wireless module 50 to form a control loop so that wireless module 50 regulates to the intended voltage.

According to embodiments of the present disclosure described above with respect to FIGS. 20, 21, a real-time-clock (RTC) is not provided. According to these embodiments, each SSL fixture 20 may receive regular time and date broadcasts from the controller 30, for example, a personal computer with the USB dongle, or a special time box containing its own wireless module along with a real-time clock and backup battery. After each SSL fixture 20 is turned on and receives the time signal, the SSL fixture 20 adjusts its internal timing and is set from a timing perspective for the rest of the day. In this configuration, each SSL fixture would be loosely dependent on the time signal, because schedules are retained within the wireless module 50 of each SSL fixture 20, and preferably backed up by flash memory or other suitable memory type, preferably within the wireless module 50. In the event a time signal is not received by the SSL fixture 20, the SSL fixture 20 may be programmed to execute a backup schedule based on the number of hours that have passed since the last valid time signal was received or since the last time the SSL fixture was last turned on.

According to the following embodiments as shown in FIGS. 22-26, circuit elements for implementing the SSL fixture 20 are provided on at least two boards (e.g., printed circuit boards) including a primary board 90 and a secondary board 92.

An embodiment of the secondary board 92 is shown in FIG. 24 and includes RTC 70, wireless module 50 and battery backup 76. According to this embodiment, to provide power for the RTC 70 when power to the SSL fixture is disrupted, the battery backup 76 provides low voltage power to the RTC 70 to maintain proper timing. According to this embodiment, battery back-up 76 senses a low voltage condition when voltage VDD falls below a predetermined value. R1 and R2 set the voltage switchover threshold, and C1 is a decoupling capacitor. Power is continually supplied through battery back-up 76 which preferably includes an integral control circuit. When a low voltage condition is detected, battery back-up 76 switches from the external supply to its battery to continue to supply power to RTC 70. Preferably, the battery backup 76 is a solid state thin film battery, such as the Cymbet Enerchip products. The RTC 70 and battery backup 76 are preferably mounted on the secondary board 92 as part of the wireless module 50, and preferably opposite the antenna (not shown). Mounting the RTC 70, battery backup 76 and wireless module 50 on the secondary board 92 reduces the temperature exposure on these components by the SSL light engine 40, and thus improves the service life for the battery backup 76 and the frequency accuracy of the RTC and wireless module circuits. Mounting the RTC 70, battery backup 76 and wireless module 50 on the secondary board 92 also facilitates field replacement for these components as the need arises. The battery back-up 76 and RTC 70 may alternatively be provided in a single IC package, e.g. Cymbet 34803. Secondary board 92 also includes one or more input/output connectors 98A facilitating mounting of the secondary board 92 to corresponding input/output connectors 98B provided on the primary board. Connector 98B is preferably a card edge connector which engages a region of the secondary board 92 acting as connector 98A. Secondary board 92 may also include sensors such as a light sensor or accelerometer.

Preferably, the wireless module 50 includes a processor (e.g., a microprocessor or microcontroller) that controls the operation of the wireless module and provides wireless network capability as a transceiver to transmit and receive wireless signals. Wireless module 50 may include one or more discrete antennae or one or more built in antennae. The antenna physically transmits and receives wireless signals. Preferably, the wireless module 50 communicates in the 2.4 GHz band using IEEE 802.15.4 protocol, however, other antennas (including on-board antennas), data rates and frequencies are also contemplated by the present disclosure. The antenna can be built onto the primary board 90 or the secondary board 92. Preferably, the antenna is a chip based antenna, or an "F" trace antenna built into the wireless module 50. A plastic enclosure or window may be provided surrounding the wireless module 50 and accompanying circuitry for protecting the components from the elements while still allowing radio waves to pass through onto the antenna. Previous wireless lighting control systems used an external antenna, which requires an antenna cable and connectors, all of which are expensive to design and implement. Thus by implementing a chip based or trace antenna, the SSL fixtures 20 of the present disclosure can be manufactured at a significantly lower price point thereby providing additional cost savings. Examples of suitable wireless modules include the SM200 RF Engines® manufactured by Synapse. The Synapse's SM200 RF Engines® are IEEE 802.15.4, surface mount modules communicating in the 2.4 GHz band and reaching data rates up to 2 Mbps. The SM200 RF Engines® can come pre-loaded with a SNAP® mesh network operating system and provide interoperability with other SNAP RF Engines. The Model SM200 embeds Synapse's SNAP OS, an Internet-enabled, wireless mesh network operating system into a single microcontroller chip with an integrated transceiver. As noted, the SM200 is capable of executing a SNAP® network operating system, which would allow multiple SSL fixtures (also called "nodes" in this context) to communicate in a mesh network, where any node (SSL fixture) can communicate to or through any node which is in range of the wireless modules 50 transmission capabilities. The SNAP® network operating system has an on-board Python language interpreter that permits rapid application development and over-the-air programming, while lowering the manufacturing costs of the wireless module 50. The SNAP format allows for inclusion of Python-coded script to be loaded onto each module, for execution of the particular application (i.e. lighting control), as will be described in more detail below.

The wireless module 50 according to embodiments of the present disclosure draws low voltage power from the SSL light engine 40 as will be described later below, thus dispensing with the need for an expensive and cumbersome transformer/power supply module. By using the low voltage power from the SSL light engine 40 there is no need to include or provide an AC/DC power supply to drive the wireless module. Also, for outdoor lighting implementations, where the SSL fixtures 20 are used for security lighting, there may be no need to fully turn off the SSL light engine at night time. The wireless module 50 may also draw low voltage power from the driver 78 as shown in dotted line in FIGS. 3-5, and as described below with respect to FIGS. 21, 23, 25 and 26. Thus, the SSL fixture 20 according to the present disclosure permits a customer to turn the lights on around dusk, for example, and off at dawn, for example, through an external switching mechanism such as a photoelectric control. In an outdoor environment, where the system is used for security lighting, the SSL light engine 40 may be dimmed down to, as low as about 10% power, in situations where high illumination levels are not needed. However, there may be a demand for on/off functionality, and the system according to the present disclosure may utilize auxiliary power from the driver 78, wherein driver 78 also provides the capability of dimming the SSL light engine 40 all the way off. With such a configuration, the SSL fixture 20 of the present disclosure can execute on/off functionality, while excluding the need and associated cost of AC relays to maintain power to the wireless module 50.

Figure 22:
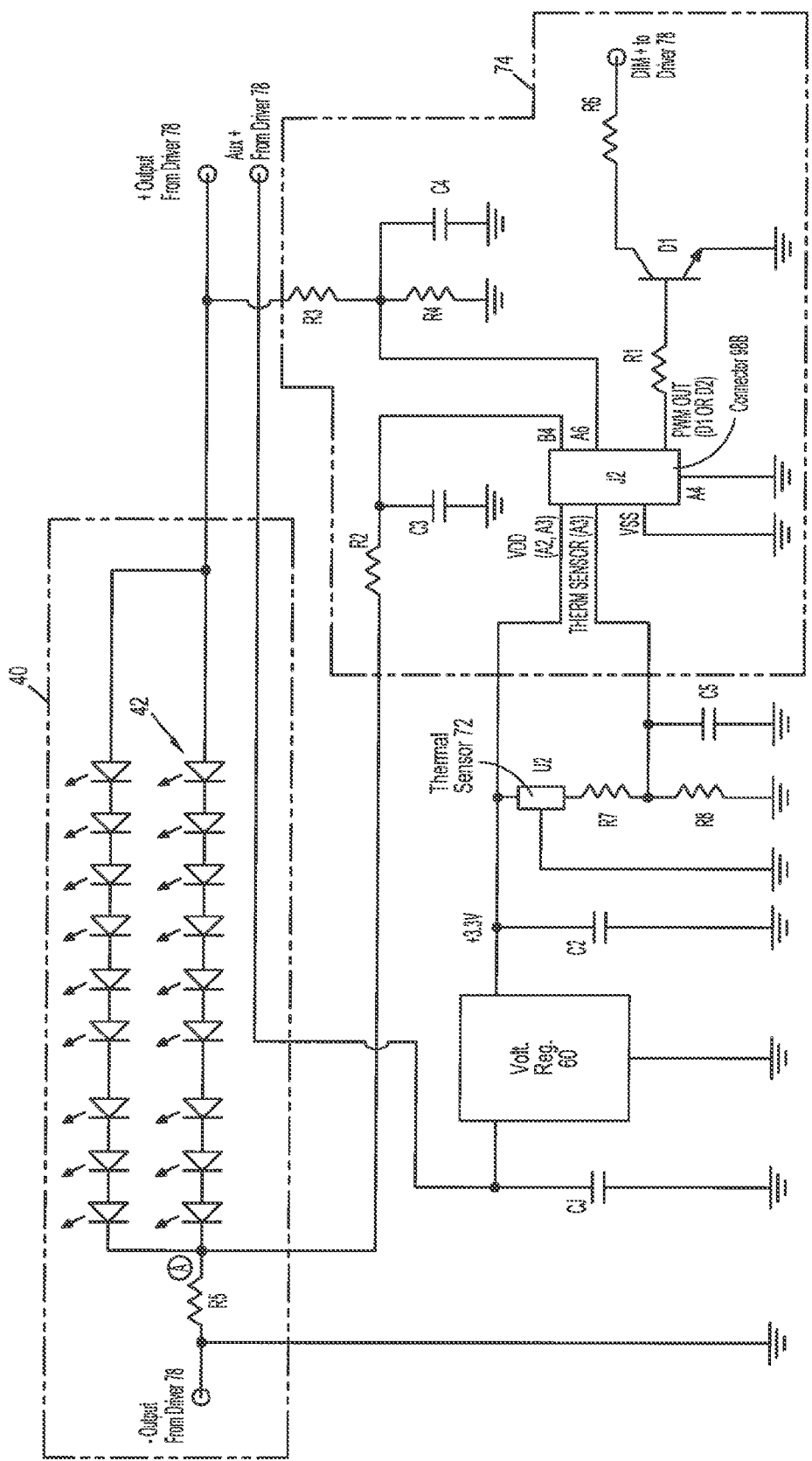
FIG. 22 is a circuit diagram for the SSL light engine according to one embodiment of the present disclosure and including connectors for mounting a secondary board.

According to an embodiment of the present disclosure shown in FIG. 22, the SSL light engine 40, voltage regulator 60, dimming output control 74 and thermal sensor 72 (see FIGS. 4, 5) are mounted on primary circuit board 90 which also includes one or more input/output connectors 98B. Thermal sensor 72 senses the temperature of the printed circuit board 90 and provides real-time temperature information to wireless module 50. Wireless module 50 is capable of storing the temperature information and can send the temperature information to controller 30 in response to a request. The stored temperature information may include the max temperature that has occurred including the date and time that the max temperature occurred. The stored temperature may be returned to controller 30 in response to the controller issuing a request to download diagnostic data. According to this embodiment, voltage regulator 60 is powered by the auxiliary power supply (Aux+) from driver 78. Voltage regulator 60 provides low voltage (3.3 volts) to RTC 70 and wireless module 50 via connector 98B. Wireless module 50 outputs a pulse width modulated signal via connector 98B which drives transistor Q1. The collector of transistor Q1 provides a PWM output signal Dim+ to driver 78.

Figure 23:
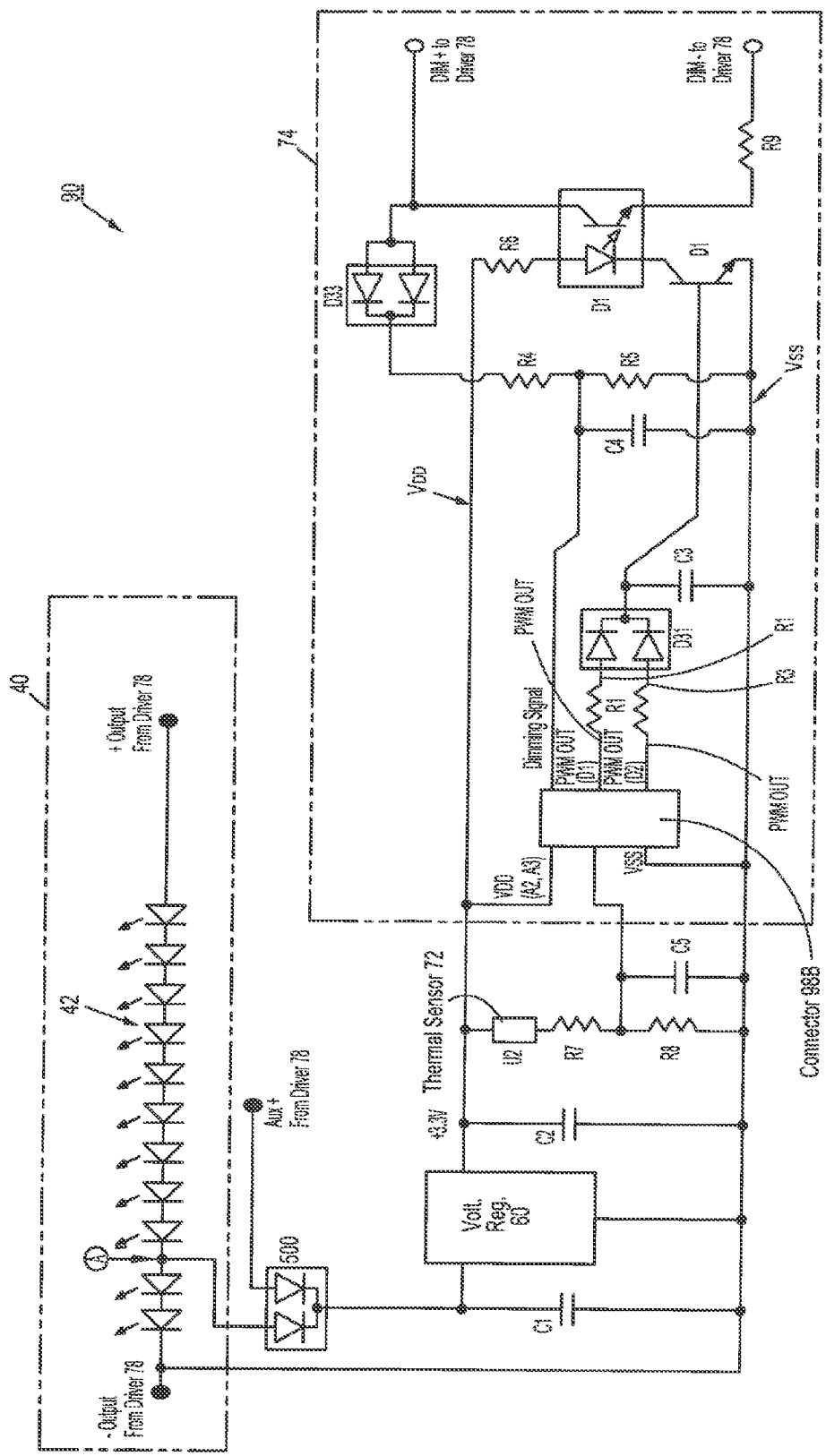
FIG. 23 is a circuit diagram for an embodiment of the SSL light engine according to the present disclosure and including connectors for mounting on a secondary board.

According to an embodiment of the present disclosure shown in FIG. 23, SSL light engine 40, voltage regulator 60, thermal sensor 72 and dimming output control 74 are mounted on primary circuit board 90. Voltage regulator 60 receives power from a tap A on the SSL elements 42 via Shottky diode 500 and outputs a regulated voltage supply VDD to RTC 70 and wireless module 50 via connector 98B. Normally, when deriving power from the SSL light engine in this manner, in order to provide a constant voltage to RTC 70 and wireless module 50, and possibly, owing to the design limitations of driver 78, SSL elements 42 would not be permitted to fully dim (or turn off), and instead would be provided with a low current by driver 78. According to this embodiment, driver 78 also may provide a constant output voltage Aux+ to voltage regulator 60 via Shottky diode 500 so that when SSL elements 42 are fully dimmed (turned off), power is still provided to voltage regulator 60 so that a constant supply of power is provided for RTC 70 and wireless module 50. RTC 70 is also provided with a constant voltage supply by battery backup 76, as described above with respect to FIG. 24 so that even if all power is lost, RTC can continue maintaining the proper time. According to this embodiment, wireless module 50 controls the dimming level using a 16 bit value internally. This value is separated into two 8 bit values—MSB and LSB. The MSB and LSB value control the duty cycle of the two 8 bit PWMs. Each PWM output is wired in series with a resistor (R1 and R3) and then a diode (D31), after which the two signals are combined and smoothed by a capacitor C3. A current is generated which is determined by the "high" PWM output voltage minus the forward voltage of D31 and the Vbe (base-emitter voltage) of transistor Q1; and the resistor values R1 and R3 and the duty cycle of each PWM. The MSB output resistor R3 is approximately 256 times less resistance than that of the LSB resistor R1, thereby ensuring that the output current will be reflective of the original 16 bit value while providing the higher frequency output of 8 bit PWMs for smoother operation. The base current into transistor Q1 determines the driving current through optical isolator O1, which in turn determines the current sourced from driver 78 dimming input lead, which determines the dimming input voltage (within a 0-10V range) to provide the drive current for the SSL elements 42, e.g., the LED, via driver 78. Noting that Q1 and O1 basically function as current amplifiers, the driver dimming current remains approximately proportional to the original 16 bit internal drive value. Preferably, the anticipated useful range encompasses the lower end of the 16-bit drive value range, to allow extra capacity for variations in component tolerance, driver interchangeability, and degradation or aging of the optical isolator. The dimming input voltage is sensed by a voltage divider circuit formed by R4 and R5 with capacitor C4 providing stability. This forms a control loop, so that the wireless module 50 can regulate to the intended voltage. Thermal sensor 72 senses the temperature of the printed circuit board 90 and provides real-time temperature information to wireless module 50 via an input circuit R7, R8, C5. Wireless module 50 is capable of storing the temperature information and can send the temperature information to controller 30 in response to a request. The stored temperature information may include the max temperature that has occurred including the date and time that the max temperature occurred. The stored temperature may be returned to controller 30 in response to the controller issuing a request to download diagnostic data. Wireless module 50 may also provide thermal regulation based on input from thermal sensor 72. In this embodiment, the control circuitry is driven at 3.3V by voltage regulator 60, eliminating the need to include an additional voltage regulator and providing a simple circuit configuration, that is less costly to manufacture and more reliable due to lower part count. Dim+ and Dim− are output to driver 78 for controlling the dimming power supplied to the SSL light engine 40.

Figure 25B:
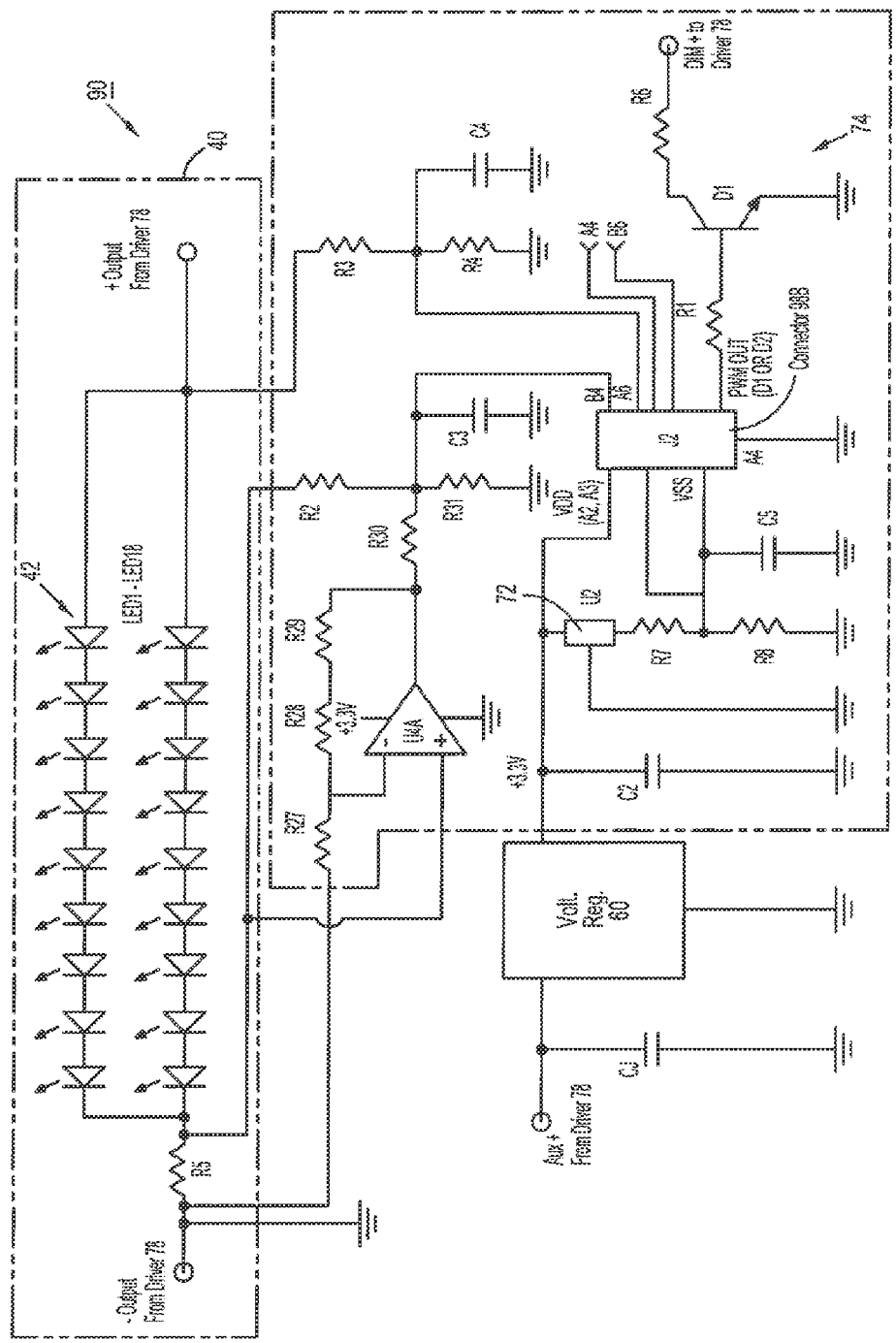
Figure 25C:
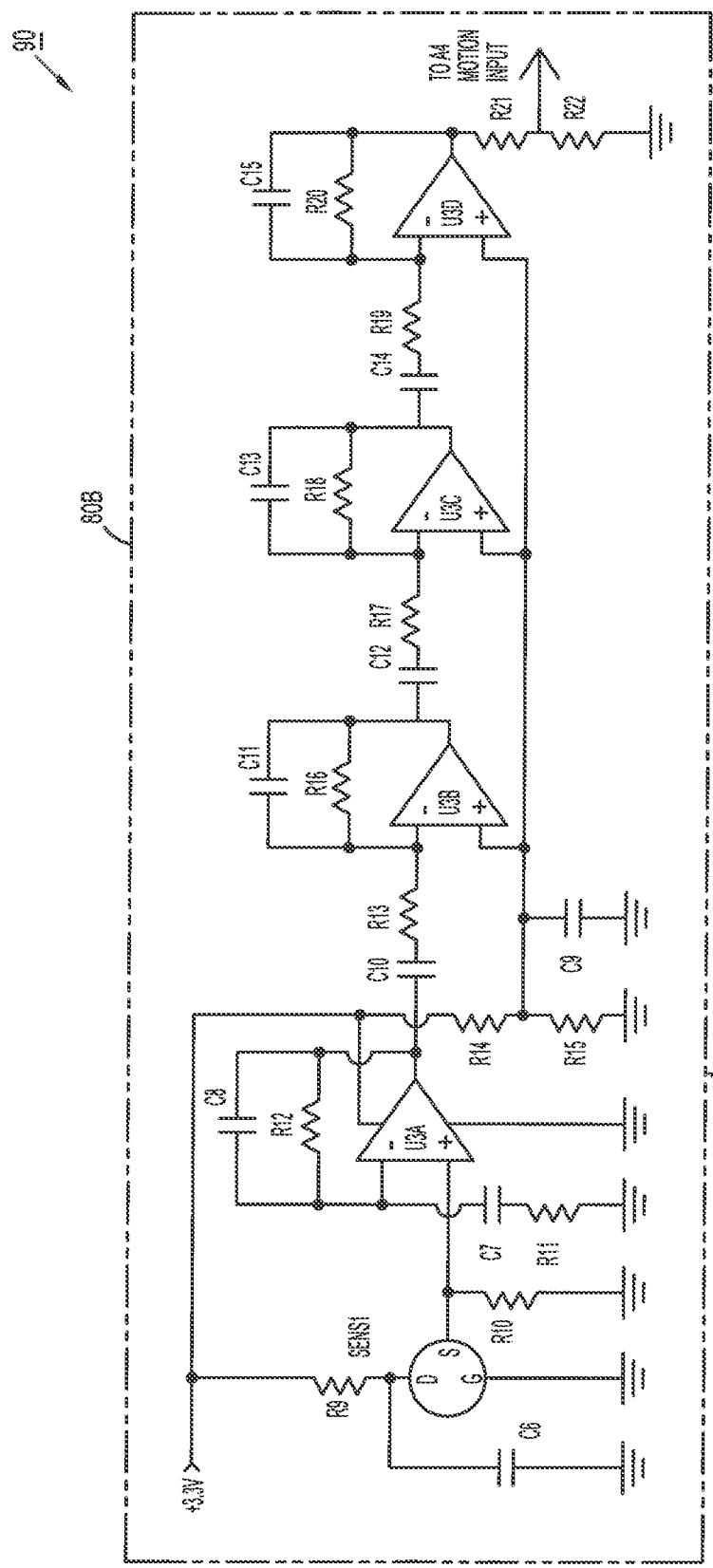

According to another embodiment of the present disclosure as shown in FIGS. 25A-25C, SSL light engine 40, voltage regulator 60, dimming output control 74, photo (e.g., light) sensor circuit 80A and motion sensor circuit 80B and one or more input/output connectors 98B are integrated on primary circuit board 90. Photo sensor circuit 80A includes photo sensor element 510 which may be an ambient light sensor APDS-9008 as manufactured by AVAGO. The output of photo sensor circuit 80A is input to wireless module 50 via connector 98B. Motion sensor circuit 80B includes a motion sensing element 520 which may be a pyroelectric, quad element sensor LHI1128 manufactured by EXCELITAS. The output of motion sensor circuit 80B is input to wireless module 50 via connector 98B. Voltage regulator 60 is powered by auxiliary power (Aux+) from driver 78. Thermal sensor 72 senses the temperature of the printed circuit board 90 and provides real-time temperature information to wireless module 50 via input circuit R7, R8, C5. Wireless module 50 is capable of storing the temperature information and can send the temperature information to controller 30 in response to a request. The stored temperature information may include the max temperature that has occurred including the date and time that the max temperature occurred. The stored temperature may be returned to controller 30 in response to the controller issuing a request to download diagnostic data. Wireless module 50 may also provide thermal regulation based on input from thermal sensor 72. Wireless module 50 outputs a pulse width modulated signal via connector 98B which drives transistor Q1. The collector of transistor Q1 provides output signal Dim+ to driver 78.

Figure 26A:
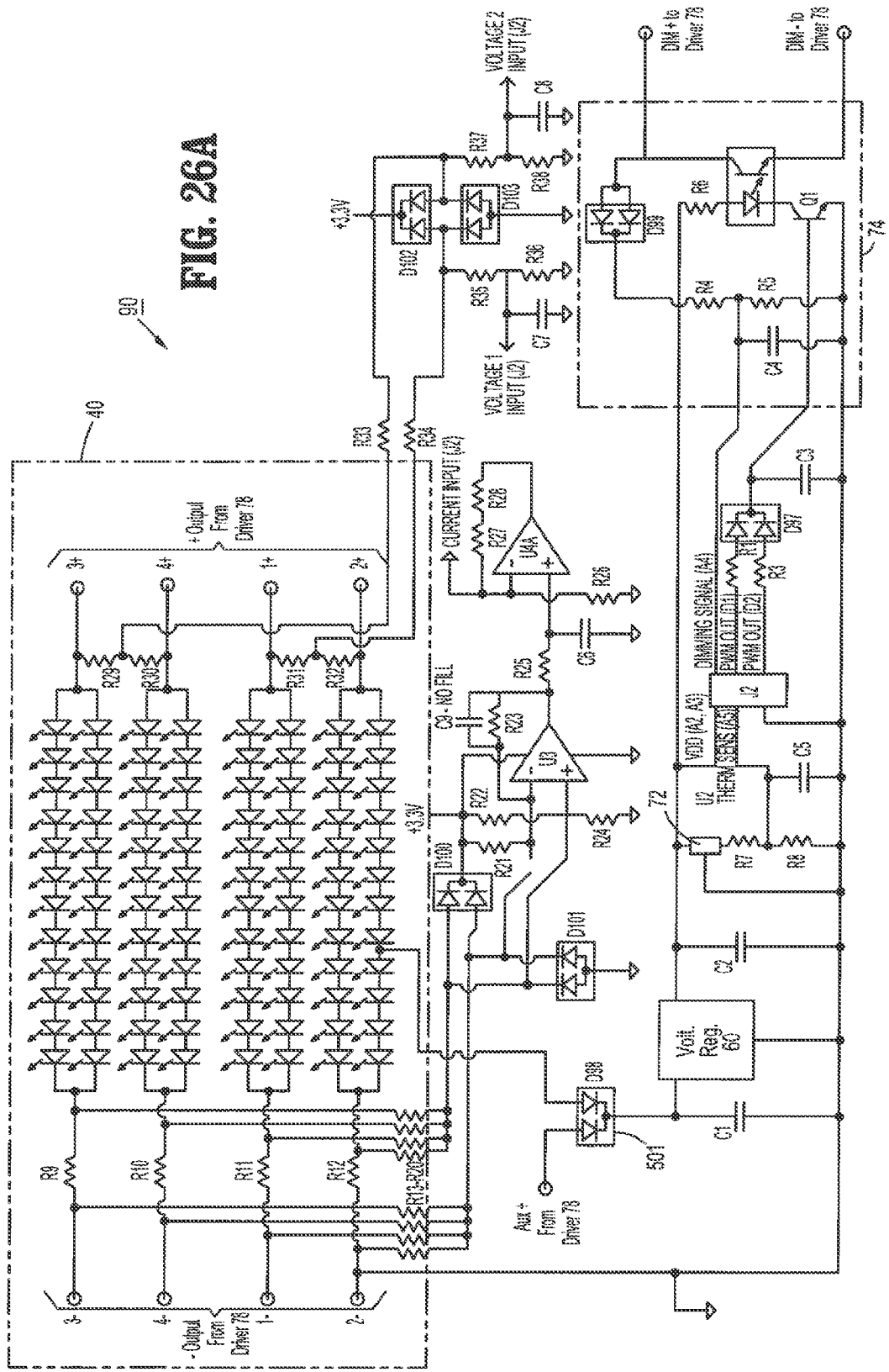
FIGS. 26A and 26B depict a circuit diagram for an embodiment of the SSL light engine according to the present disclosure including circuitry for connecting to an external motion sensor.
Figure 26B:
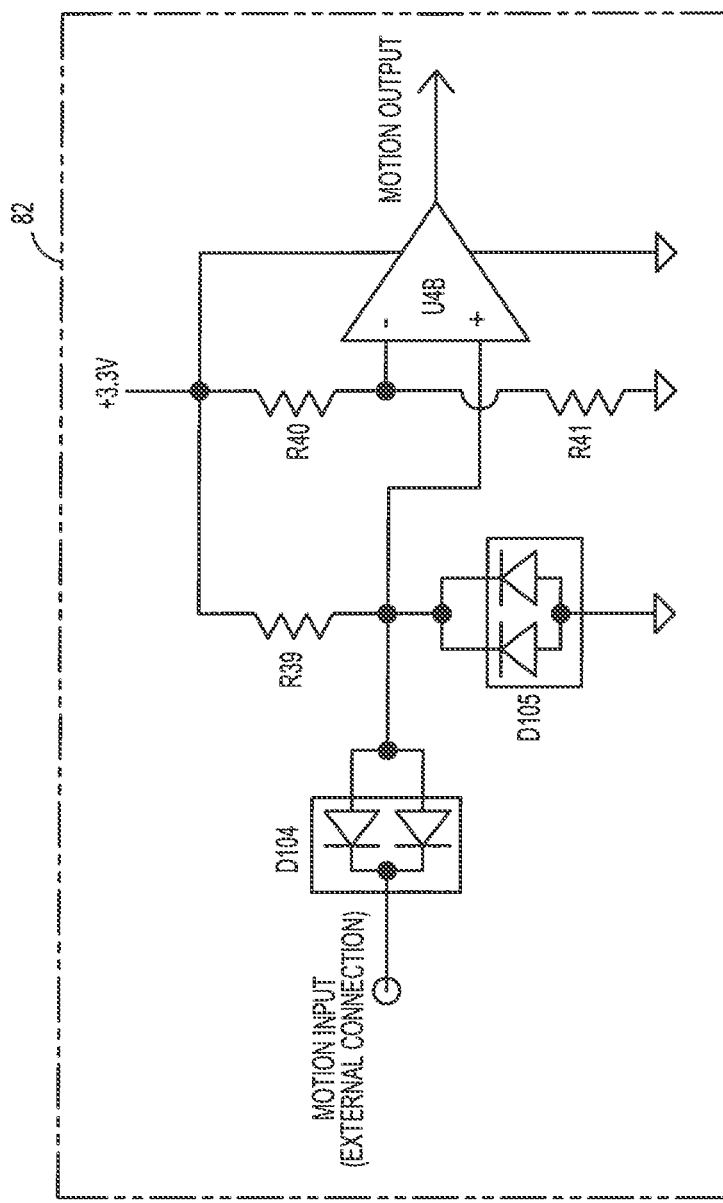

According to another embodiment of the present disclosure as shown in FIGS. 26A 26B, SSL light engine 40, voltage regulator 60, dimming output control 74, motion sensor interface 82 and one or more input/output connectors 98B are integrated on primary circuit board 90. Motion sensor interface 82 provides an interface between a remote motion sensor and wireless module 50 via an external input. Voltage regulator 60 receives power from a tap A on the SSL elements 42 via Shottky diode 501 and outputs a regulated voltage supply VDD to RTC 70 and wireless module 50 via connector 98B. Normally, when deriving power from the SSL light engine in this manner, in order to provide a constant voltage to RTC 70 and wireless module 50, SSL elements 42 would not be permitted to fully dim (or turn off), and instead would be provided with a low current by driver 78. According to this embodiment, driver 78 also provides a constant output voltage Aux+ to voltage regulator 60 via Shottky diode 501 so that when SSL elements 42 are fully dimmed (turned off), power is still provided to voltage regulator 60 so that a constant supply of power is provided for RTC 70 and wireless module 50. RTC 70 is also provided with a constant voltage supply by battery backup 76, as described above with respect to FIG. 24 so that even if all power is lost, RTC can continue maintaining the proper time. According to this embodiment, wireless module 50 controls the dimming level using a 16 bit value internally. This value is separated into two 8 bit values—MSB and LSB. The MSB and LSB value control the duty cycle of the two 8 bit PWMs. Each PWM output is wired in series with a resistor (R1 and R3) and then a diode (D97), after which the two signals are combined and smoothed by a capacitor C3. A current is generated which is determined by the "high" PWM output voltage minus the forward voltage of D97 and the Vbe (base-emitter voltage) of transistor Q1; and the resistor values R1 and R3 and the duty cycle of each PWM. The MSB output resistor R3 is approximately 256 times less resistance than that of the LSB resistor R1, thereby ensuring that the output current will be reflective of the original 16 bit value while providing the higher frequency output of 8 bit PWMs for smoother operation. The base current into transistor Q1 determines the driving current through optical isolator O1, which in turn determines the current sourced from driver 78 dimming input lead, which determines the dimming input voltage (within a 0-10V range) to provide the drive current for the SSL elements 42, e.g., the LED, via driver 78. Noting that Q1 and O1 basically function as current amplifiers, the driver dimming current remains approximately proportional to the original 16 bit internal drive value. Preferably, the anticipated useful range encompasses the lower end of the 16-bit drive value range, to allow extra capacity for variations in component tolerance, driver interchangeability, and degradation or aging of the optical isolator. The dimming input voltage is sensed by a voltage divider circuit formed by R4 and R5 with capacitor C4 providing stability. This forms a control loop, so that the wireless module 50 can regulate to the intended voltage. Thermal sensor 72 senses the temperature of the printed circuit board 90 and provides real-time temperature information to wireless module 50. Wireless module 50 is capable of storing the temperature information and can send the temperature information to controller 30 in response to a request. The stored temperature information may include the max temperature that has occurred including the date and time that the max temperature occurred. The stored temperature may be returned to controller 30 in response to the controller issuing a request to download diagnostic data.

Embodiments of the present disclosure described above with respect to FIGS. 25 and 26 include photo and/or motion sensor capabilities. These sensors are used to detect light and/or motion in an area to be illuminated, and allow wireless module 50 to activate or adjust the brightness (i.e., dim) the SSL fixture 20 accordingly. An SSL light fixture 20 which includes an internal motion and/or photo sensor can be programmed as a master to wirelessly control other SSL light fixtures in a designated group or a predetermined zone via wireless network 36. Using SSL fixtures with a sensor interface 82 (FIG. 26) permits the SSL system to be configured such that one motion sensor can directly control one or more SSL fixtures 20. Thus, if the motion sensor 84 is strategically placed (i.e. entrances to the illuminated space) multiple SSL fixtures 20 can be illuminated in segments, which may render a more pleasing way of illuminating an area as opposed to illuminating each SSL fixture on a fixture-by-fixture basis as a person walks through a covered area. Passive infrared (PIR) motion sensors are typically most sensitive to persons or objects as they pass tangentially relative to the sensor. Combined with any latencies involved, sensor activated fixtures may tend to change brightness when the pedestrian has already passed through a substantial portion of the illuminated area, reducing the effectiveness of having motion sensing controls. By grouping multiple fixtures to one sensor, this drawback is mitigated. Also as a result, cost savings on motion sensor equipment may be realized.

Aspects of the driver 78 according to an embodiment of the present disclosure will be described by reference to FIGS. 34A-34C and 35. The driver 78 is designed to simplify manufacturing by having the wiring integrated, including AC pigtails, and an output harness with a connector for plugging into the SSL light engine 40. As shown in block diagram form in FIG. 35, the AC input is first subject to surge and electromagnetic suppression 78A. Power factor correction 78B is then performed to provide a ~450V DC bus to drive isolated DC/DC circuitry 78D and auxiliary power supply 78C. Isolated DC/DC circuitry 78D generates drive outputs Output+ and Output− for driving SSL light engine 40 in response to dimming output control signals Dim+ and Dim− from the dimming output control circuitry 74. Dim+ and Dim− are pulse width modulated (PWM) signals. Auxiliary power supply 78C generates constant voltage/constant current outputs Aux+ and Aux− providing auxiliary power to elements of the SSL fixture 20 as will be described herein. A single ground circuit may combine one or more of Output, Dim−, and Aux−.

Figure 34A:
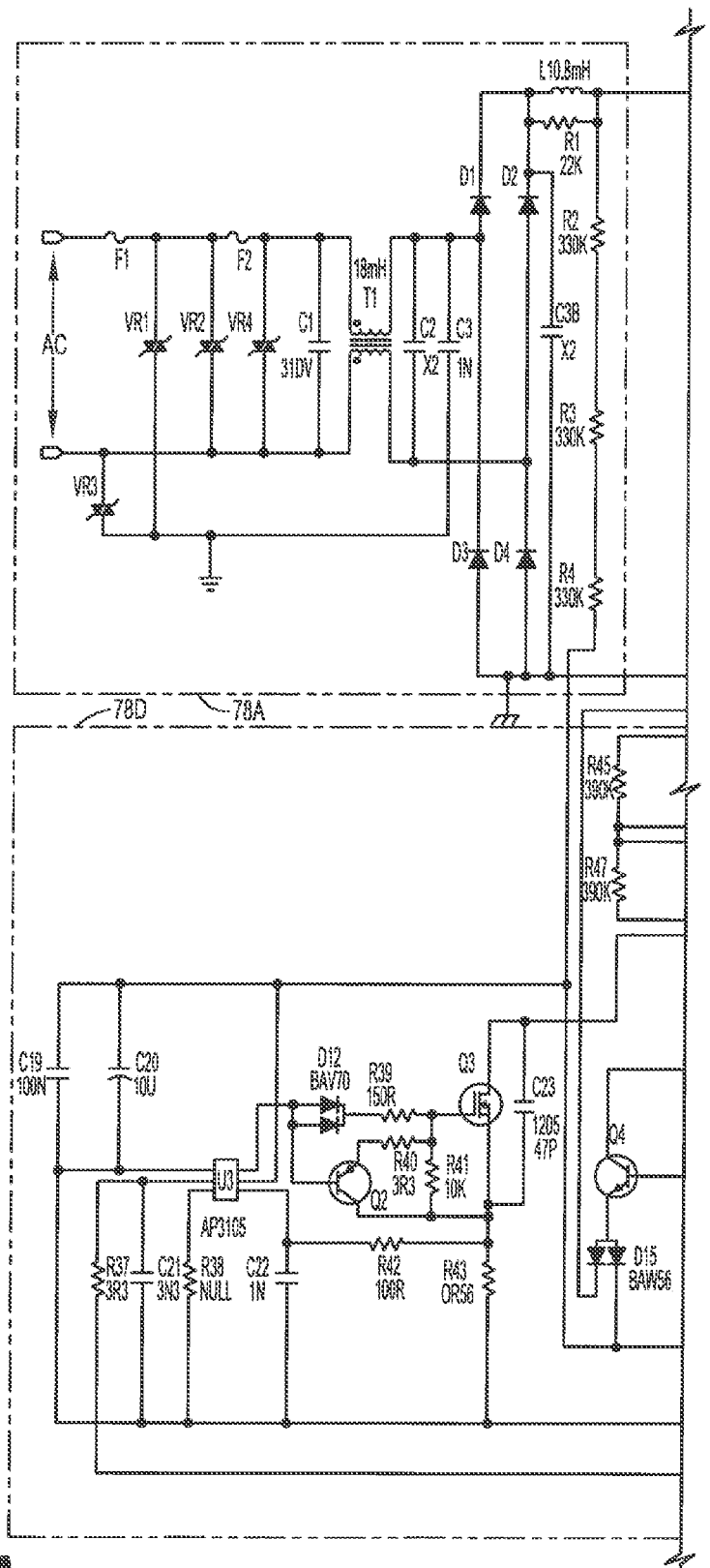
Figure 34B:
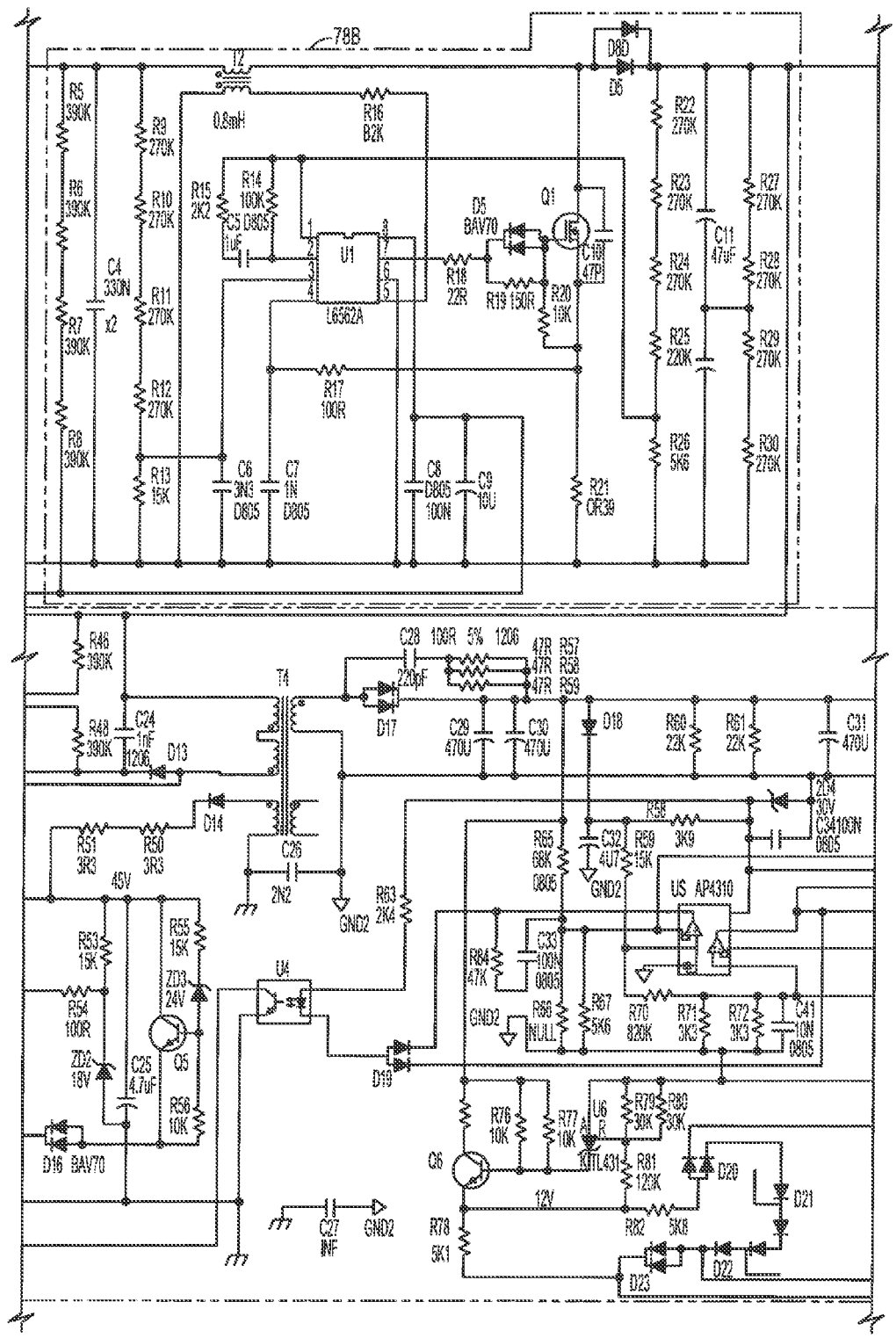
Figure 34C:
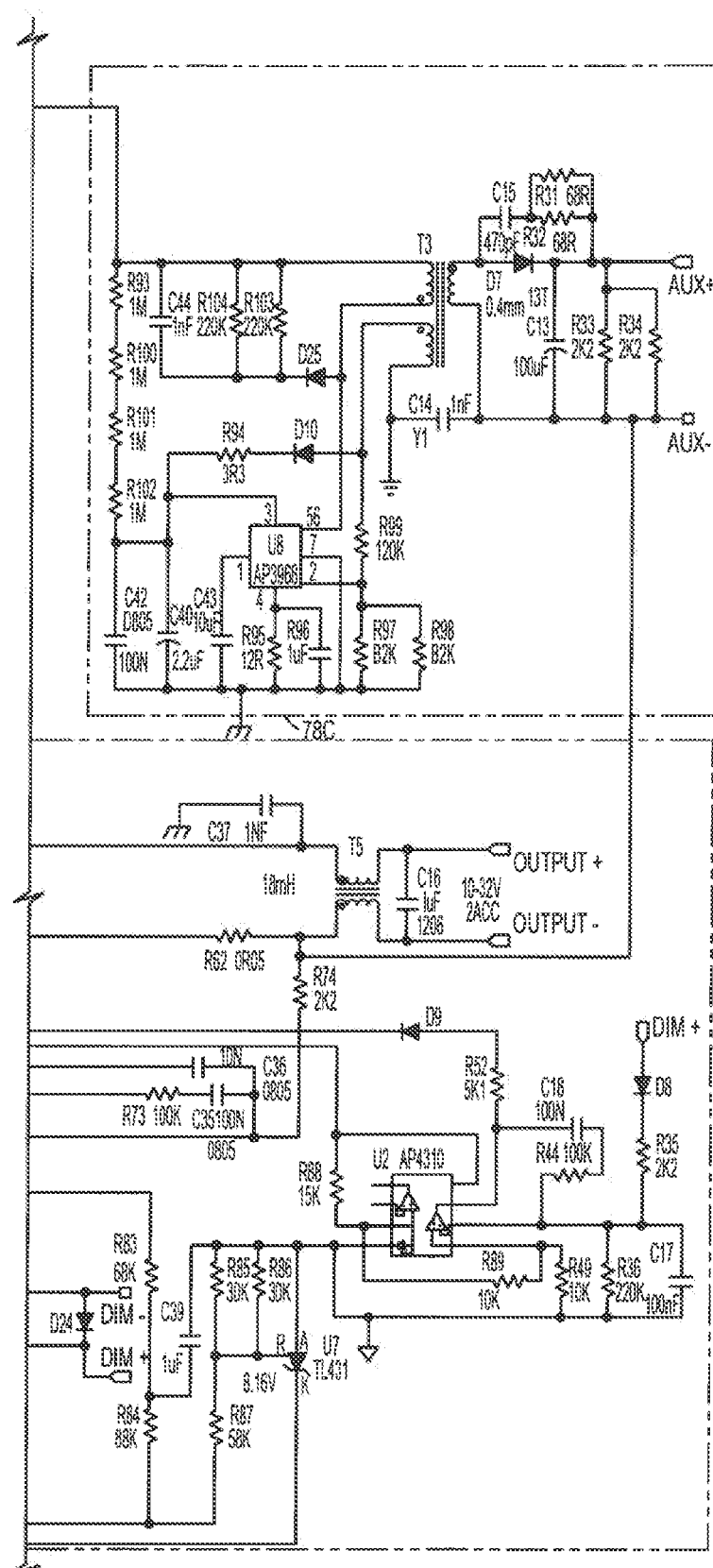

As shown schematically in FIGS. 34A-34C, AC input is provided to Metal Oxide Varistors (MOVs) 22 which are integrated within the driver 78 and provide surge suppression (78A). According to this embodiment of the present disclosure, power factor correction (78B) is performed utilizing a transition-mode PFC controller UI such as the L6562A (sold by STMicroelectronics) along with supporting circuitry as shown. Auxiliary power supply 78C is driven by a primary side regulation controller U8 such as the AP3968 (sold by BCD) and accompanying circuitry. Auxiliary power supply 78C provides constant voltage outputs Aux+ and Aux−. Isolated DC/DC circuitry 78D includes a high voltage green mode PWM controller U3 such as the AP3105 (sold by BCD) and accompanying circuitry. Isolated DC/DC circuitry 78B provides output drive signals Output+ and Output− for driving SSL light engine 40 (see FIG. 3). Isolated DC/DC circuitry 78D is capable of driving SSL light engine 40 from full on (100% brightness) down to being totally extinguished (0% brightness) based on dimming control signals Dim+ and Dim−. Driver 78 may be provided on a separate PCB board that can be electrically connected to the other elements of the SSL fixture. In the alternative, some or all of the circuitry of driver 78 may be provided on one or more circuit boards (e.g., primary board 90 and/or secondary board 92) carrying other elements of the SSL fixture 20.

As described in the above embodiments, wireless module 50 can be mounted to either the primary board 90 or the secondary board 92, which is on the secondary side of the drivers 78. Thus, in instances where the system power is to be determined, a measurement process is implemented to determine the system power. In an optional method to calibrate the power measurement for improved accuracy, an SSL fixture 20 is tested prior to field installation and calibrated against an accurate AC power meter. The SSL fixture 20 is cycled through a series of dimming levels, and the product of its current and voltage sensors at those dimming levels, and the AC power meter reading, are collected. The SSL fixture (or an external device) then calculates a conversion factor at each dimming level (which essentially accounts for driver losses and offsets to some degree any inaccuracy in the on-board sensing circuits). The AC power meter readings may be inputted manually or preferably automatically. Processing may be distributed between fixture 20 and an external computing device, with the end result that the fixture 20 is programmed with appropriate power conversion factors. When the SSL fixture is in service (i.e., installed in the field), the SSL fixture can interpolate between the programmed points to generate the conversion factor for its present dimming level. The resultant conversion factor is applied to the voltage-current product to generate a wattage measurement. This system is intended primarily for the user's information and energy usage decision making. The described calibration process may be part of a larger process to program the fixture 20 and test its functionality.

Figure 6:
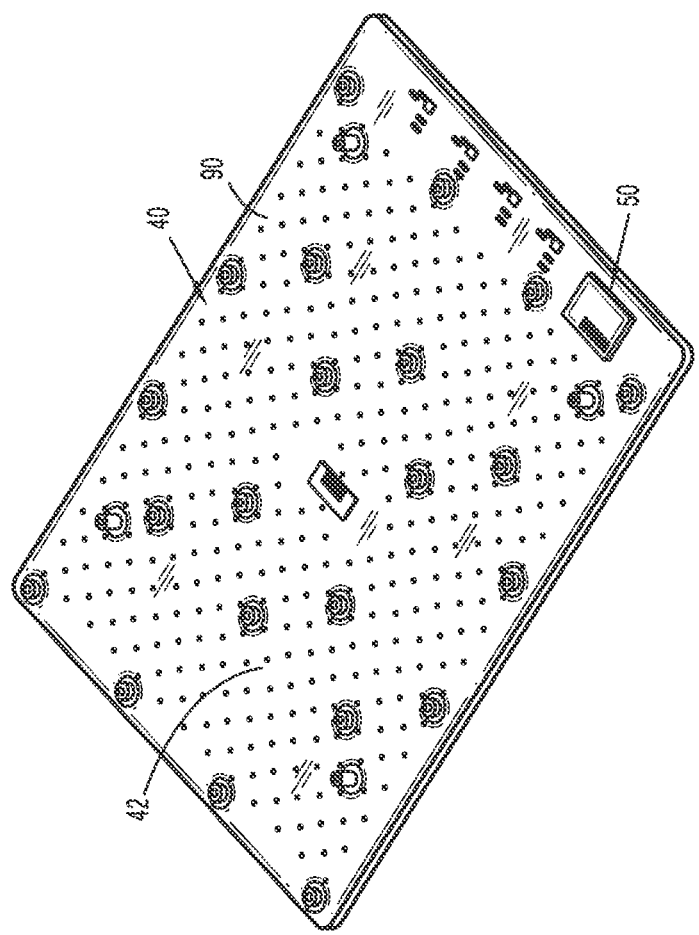
FIG. 6 is an embodiment of an SSL light engine according to the present disclosure, illustrating a plurality of SSL elements and a wireless module mounted to a primary printed circuit board.

The physical layout and structure of SSL fixtures 20 according to embodiments of the present disclosure will now be described by reference to FIGS. 6-19. Referring to FIG. 6, an SSL light engine 40 according to an embodiment of the present disclosure may include one or more SSL elements 42 used to illuminate a desired area. The SSL elements 42 may include any solid state lighting element, such as an LED lighting element. Preferably, the SSL light engine 40 includes a plurality of SSL elements 42 mounted to a printed circuit board referred to herein as primary board 90 in an array or other configuration capable of lighting a desired area. The SSL light engine 40 and primary board 90 may be enclosed in a housing 100 (see FIGS. 15 and 16) for installation in a commercial, industrial, or residential environment either indoors or outdoors.

Figure 7:
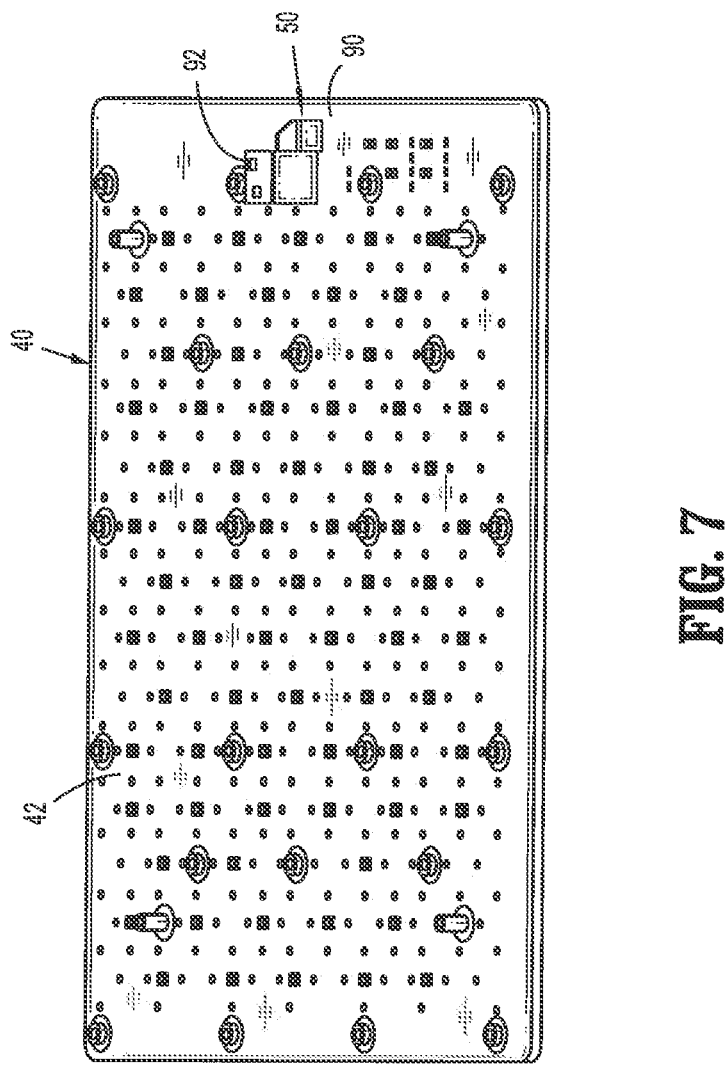
FIG. 7 is another embodiment of an SSL light engine according to the present disclosure, illustrating a plurality of SSL elements mounted to a primary printed circuit board and a wireless module mounted to a secondary circuit board.

Referring to FIGS. 6 and 7, the wireless module 50 may be mounted directly on the primary board 90 (FIG. 6), or the secondary board 92 including wireless module 50 (see FIG. 24) can be mounted to the primary board 90 (FIG. 7). The wireless module 50 is preferably enclosed by a plastic enclosure 94 (seen in FIGS. 12 and 13) so that radio waves can pass through the enclosure 94 while protecting the wireless module 50 components from external elements (e.g., weather, vandalism). By mounting the wireless module 50 on the primary board 90, or the secondary board 92 mounted on the primary board 90, the cost of the SSL fixture 20 and thus the SSL system 10 is greatly reduced. For example, separate housings are not needed for the SSL light engine 40 and for the wireless module 50, thus significantly reducing manufacturing costs.

Referring again to FIG. 6 and corresponding embodiments of circuit diagrams in FIGS. 20 and 21, an embodiment of the wireless module integrated into the primary board 90 is shown. In this embodiment, the wireless module 50 (and battery backup 76, RTC 70) is mounted directly on the primary printed circuit board 90, which has a rectangular opening in the printed circuit board directly below where an antenna is positioned on the primary circuit board 90. In another embodiment, a spacer may be positioned between the wireless module 50 and SSL light engine 40 to further isolate the wireless module 50, notably the antenna, from the metal of the primary printed circuit board 90 and SSL fixture enclosure, and to provide improved line of sight from the antenna to the surrounding environment. Preferably, as shown in FIG. 7 and corresponding embodiments of circuit diagrams in FIGS. 22-26, the wireless module 50 is mounted to the secondary board 92, which is then mounted transversely to the primary board 90 of the SSL light engine 40. In this embodiment, the antenna is situated a distance (e.g., about an inch) away from the plane of the primary board 90 and is visible to the external environment and capable of receiving and transmitting radio waves while protected by enclosure 94. As is described in more detail below, the secondary board 92 plugs into the primary board 90 via a card edge-type or other suitable connector 98, and is enclosed by the plastic enclosure 94. Preferably, the enclosure is configured for easy removal to facilitate field replacement of the wireless module 50.

Figure 8:
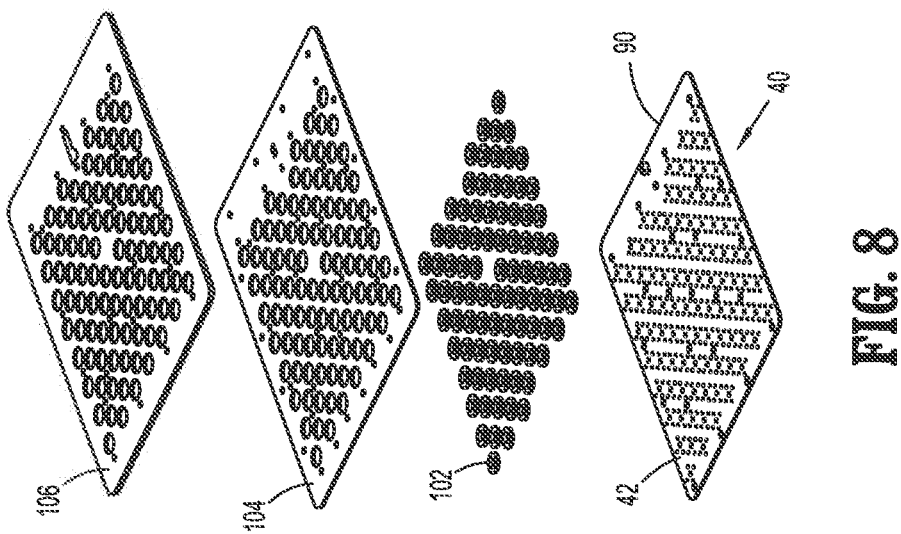
FIG. 8 is an embodiment of a portion of the SSL fixture according to the present disclosure, illustrating a housing mounting plate, gasket and a plurality of SSL element lenses for positioning over a plurality of SSL elements of an SSL light engine.
Figure 9:
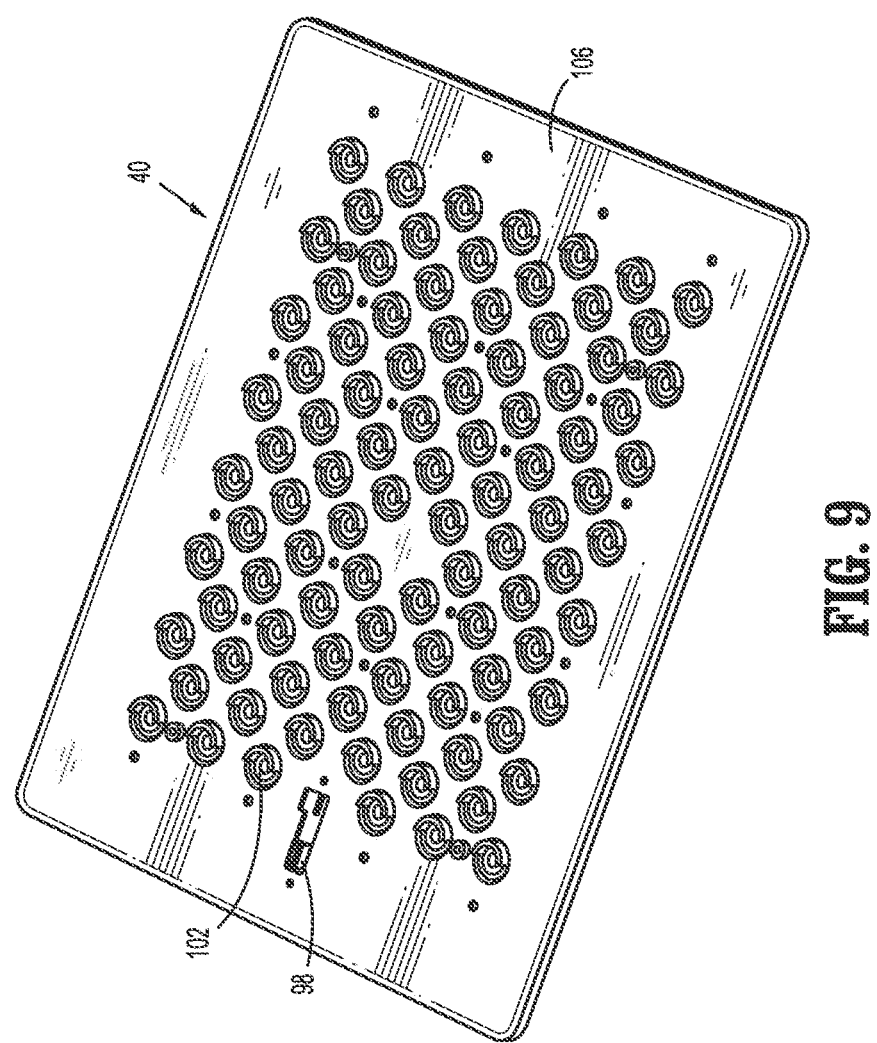
FIG. 9 illustrates the housing mounting plate, gasket and a plurality of SSL element lenses mounted to the SSL light engine of FIG. 8.
Figure 10:
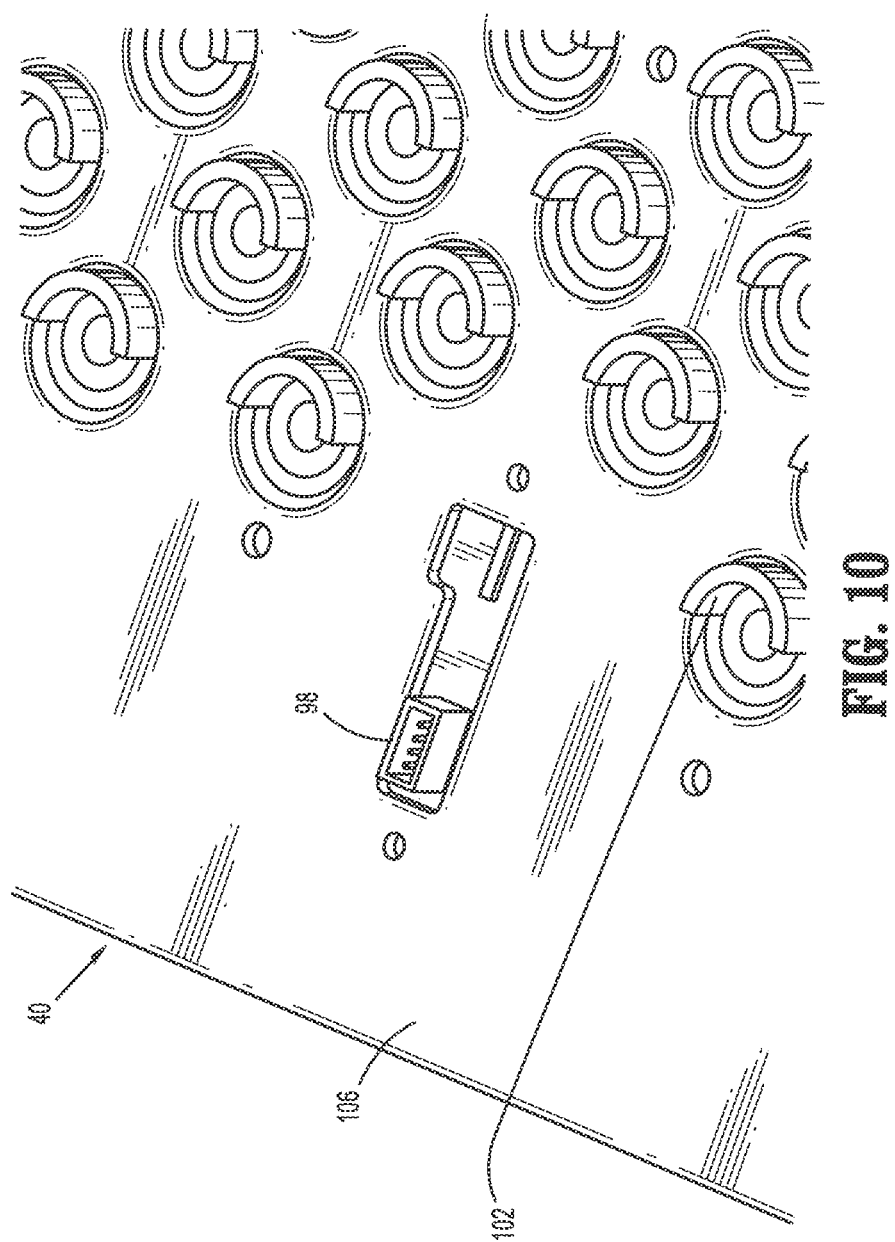
FIG. 10 is an enlarged view of the portion of the SSL fixture of FIG. 9, illustrating a connector for mounting a secondary circuit board of a wireless module to a primary printed circuit board of the SSL light engine.
Figure 11:
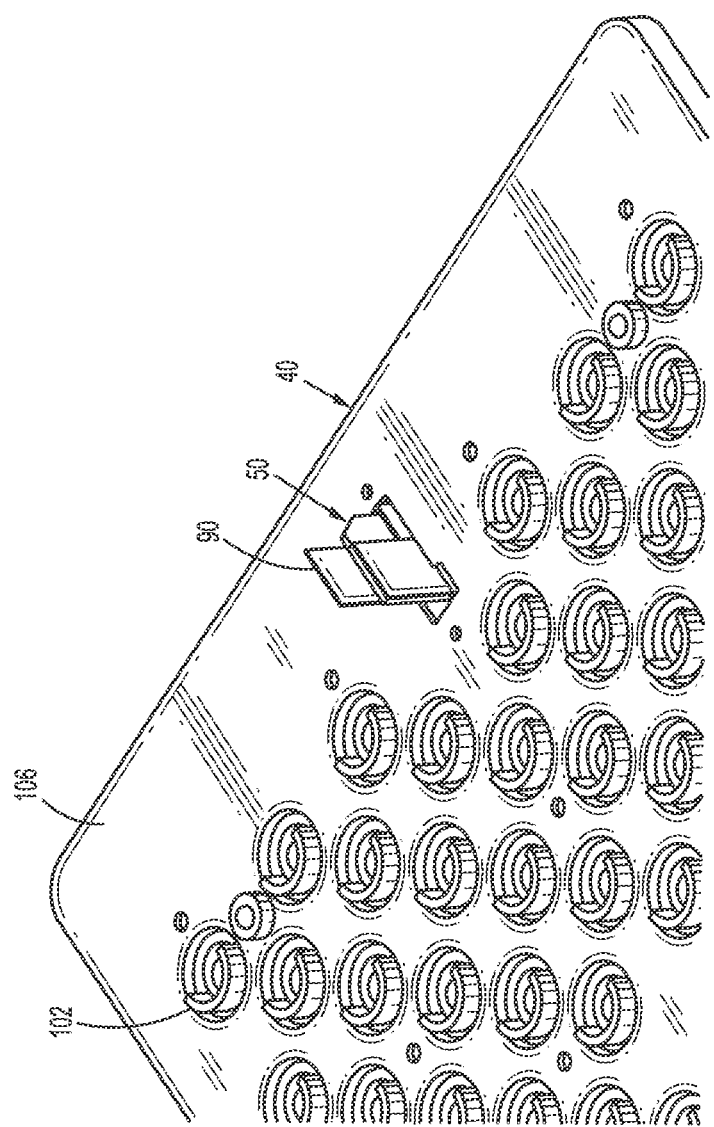
FIG. 11 is an enlarged view of the portion of the SSL fixture of FIG. 10, illustrating the secondary circuit board of the wireless module mounted to the connector of the primary printed circuit board of the SSL light engine.
Figure 13:
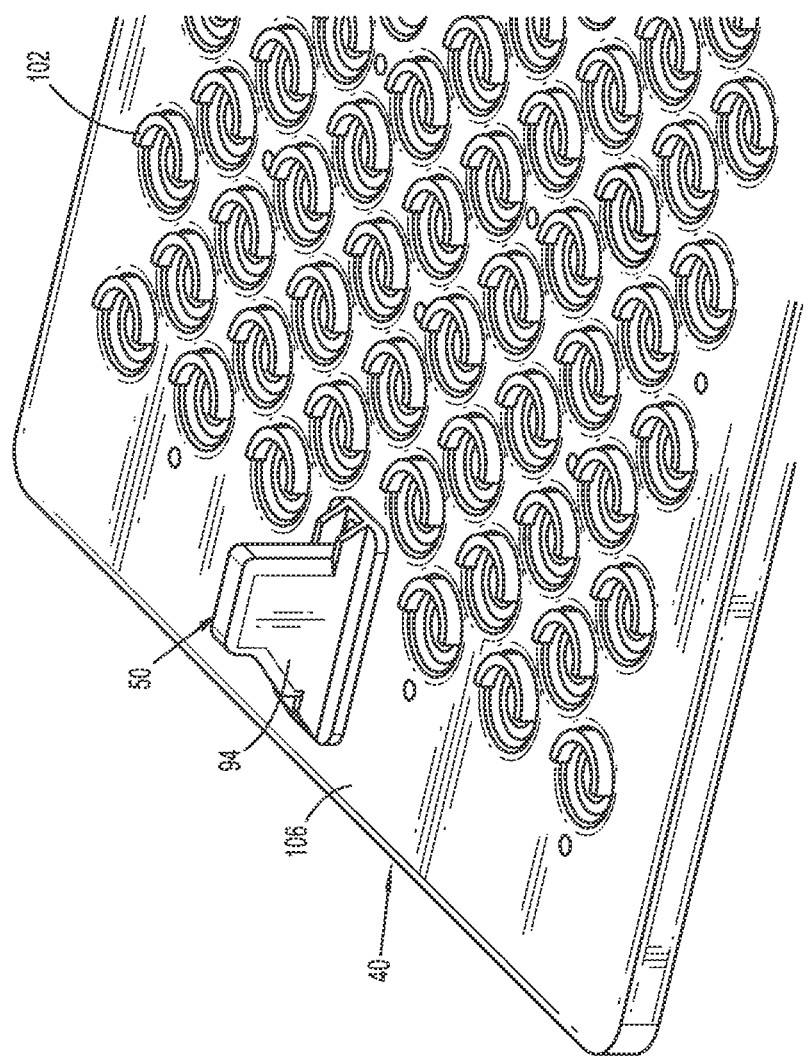
FIG. 13 is an enlarged view of the portion of the SSL fixture of FIG. 11, illustrating the enclosure of FIG. 12 mounted over the wireless module and attached to the housing mounting plate.
Figure 14:
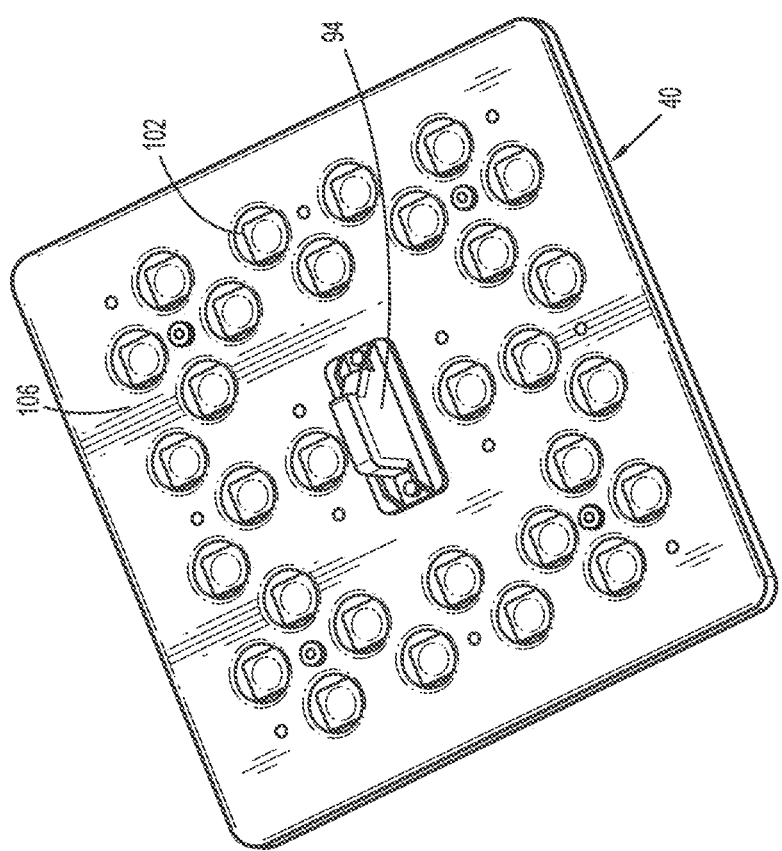
FIG. 14 is an assembled SSL light engine and wireless module according to another embodiment of the present disclosure, illustrating a different SSL element configuration.

Referring to FIGS. 8-14, various views an SSL fixture 40 according to embodiments of the present disclosure are shown. In FIG. 8, an assembly for mounting the SSL light engine 40 into the housing 100 is shown. In this embodiment, a plurality of SSL element lenses 102 are positioned over each SSL element 42 mounted on a primary board 90. A gasket 104 is then placed over the lenses 102 to ensure alignment of the lenses over the primary board 90 and SSL elements 42, and to weatherproof the SSL light engine 40 when in the housing 100. A housing mounting plate 106 is then positioned over the gasket 104 and attached to the primary board 90 via screws or other suitable fasteners or adhesives. A secondary gasket may be included to seal around the perimeter of the housing mounting plate 106. FIGS. 9 and 10 illustrate the connector 98B on the primary board 90 extends through the housing mounting plate 106 for connection with the secondary board 92 via connector 98A. The lenses 102 extend through the housing mounting plate 106 for directing light toward the desired area to be illuminated. FIG. 11 illustrates the wireless module 50 connected to the connector 98B of the primary board 90. FIG. 12 illustrates a side view of one side of the wireless module 50, secondary board 92 and enclosure 94. FIG. 13 illustrates the enclosure 94 mounted over the wireless module 50 and secured to the housing mounting plate 106 with gasket 96 weatherproofing the wireless module from the environment. FIG. 14 illustrates an alternative configuration for the SSL elements 42 and lenses 102. According to this embodiment, the wireless module 50 and enclosure 94 are provided substantially in the center of the device.

Figure 15:
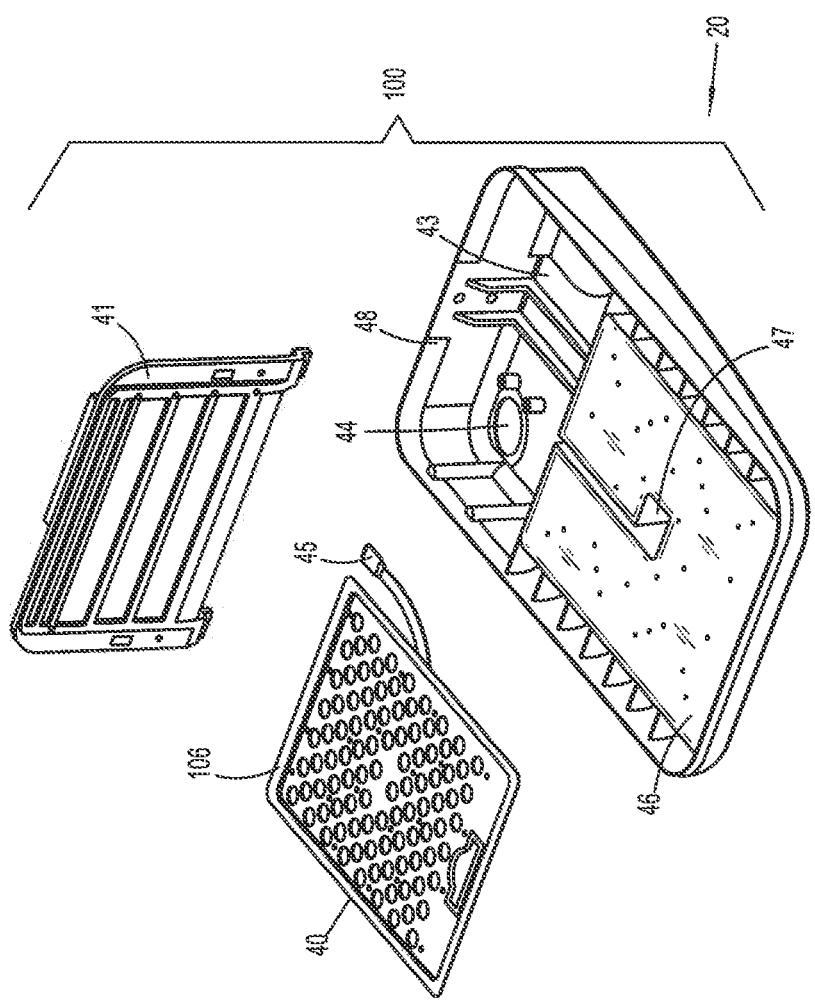
FIG. 15 is an embodiment of an disassembled SSL fixture according to the present disclosure, where an SSL light engine and wireless module are enclosed within a housing.
Figure 16:
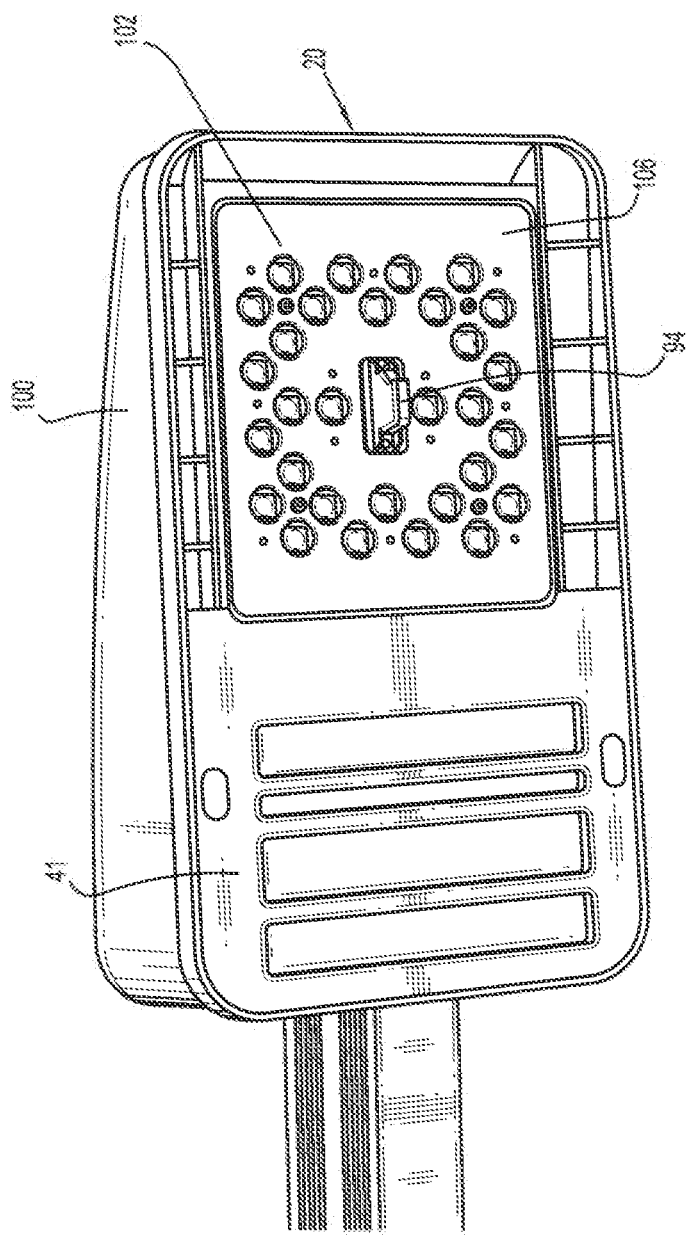
FIG. 16 is an embodiment of an assembled SSL fixture according to the present disclosure, where an SSL light engine and wireless module are enclosed within a housing.

According to another embodiment of the present disclosure, the SSL fixture is mounted in a housing 100 as shown in FIGS. 15 and 16. More specifically, SSL light engine 20 is mounted in portion 46 of lower housing 48. Space 43 is provided in lower housing 48 for facilitating one or more external sensors 84 (FIG. 5) and the fixture drivers 78 and related components. A photo sensor (not shown) may be positioned such that the sensor socket extends into opening 44 so that the sensor can sense light. Such a sensor simply switches power to fixture 20 and does not directly communicate with the control system. A connector 45 extends from SSL fixture 20 for connection to power and dimming circuits from one or more drivers 78. A cover plate 41 is used to enclose space 43 to protect circuitry provided therein from the elements.

Figure 17:
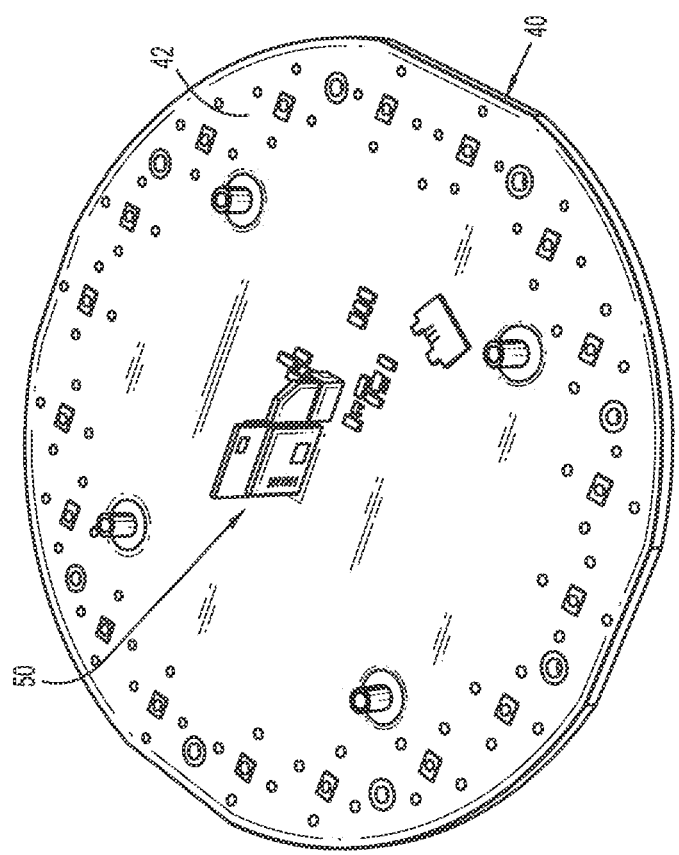
FIG. 17 is an assembled SSL light engine and wireless module according to another embodiment of the present disclosure, illustrating an alternative SSL element configuration.
Figure 18:
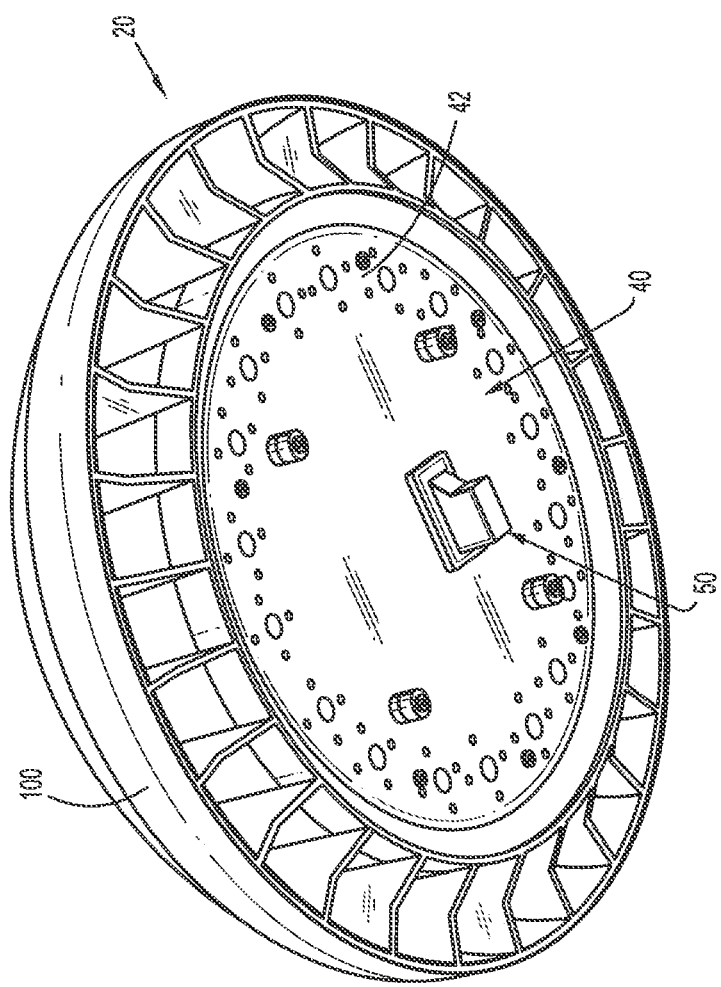
FIG. 18 is a perspective view of an assembled SSL fixture according to the present disclosure, where an SSL light engine and wireless module of FIG. 17 are enclosed in an alternative housing.
Figure 19:
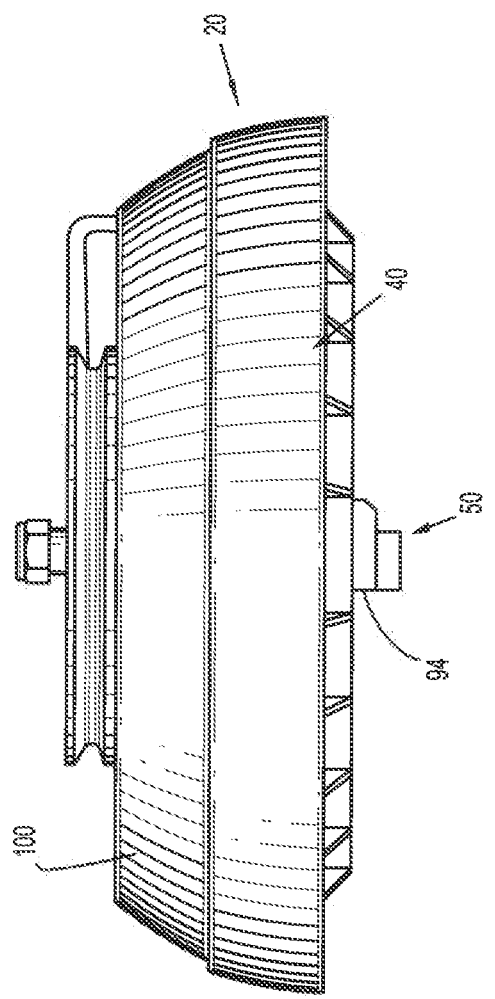
FIG. 19 is a side view of the assembled SSL fixture of FIG. 18.

Referring to FIGS. 17-19, an alternative embodiment of an SSL fixture configuration is shown. In this embodiment the housing is a circular housing 100 and the SSL light engine 40 is configured to fit within the circular housing 100 where the SSL elements 42 are distributed in a circular pattern. The wireless module 50 is positioned in or near the center of the SSL light engine and operates in a similar manner as described above. This embodiment may or may not provide for external sensors 84, or switching controls mounted within the fixture housing.

In instances where the SSL system and SSL fixtures 20 are to be implemented in a commercial or industrial application, e.g., lighting for a parking lot or street lighting, customers may have specific operational requirements for the lighting paradigm contemplated. In such instances, it may be preferable that the SSL system is pre-configured with customer specific requirements prior to physical installation of the system in the field. To pre-configure the SSL system, a customer first provides their specific requirements, for example, by completing a questionnaire, or if the customer specific requirements call for greater variation or are more complex, by customer provided configuration file where the customer identifies the desired specifications (e.g., by identifying appropriate names and type numbers to each unique configuration). A customer may also provide a site layout, which can be used to determine which SSL fixtures may be set as repeaters. The customer provided configuration specification is reviewed and if appropriate one or more wireless modules are programmed in accordance with the configuration requirements, and respective network addresses are assigned to each SSL fixture within the configuration file, along with the names and/or type numbers defined by the customer. The network address is preferably a 6 character subset of the device's full MAC address. When a customer receives the pre-programmed SSL fixtures in the field, they can install, without the need for expensive field service personnel, each SSL fixture in the SSL system in the appropriate location based on the pole number or type number, etc. Each SSL fixture in the SSL system now has the appropriate settings programmed for its installed location. The user or customer then only has to update the time clocks in each SSL fixture. To set the time clock, a user may install the user interface software and execute the command to update the time clock. Alternatively, the time clock may be updated automatically on a periodic basis pre-programmed into the SSL system or wirelessly via the controller 30. The set-up of the SSL system and each SSL fixture are greatly simplified thus reducing the need to hire professional field service consultants.

After physical installation of the SSL system, including each SSL fixture 20 in the system, each SSL fixture 20 can be set up using a user interface program, if the above described pre-configuration is not performed. Generally, the user interface software or program provides a user the ability to learn the SSL system configuration and to adjust the settings for each SSL fixture 20 within the system. Generally, each SSL fixture 20 in the SSL system can be assigned a group number. For convenience, settings for each SSL fixture 20 in a group can be adjusted simultaneously. SSL fixture settings include, for example, schedules of times and dimming intensities corresponding with those times. Any of these schedules may be selected to correspond to each day of the week, or for one or more special dates. When a user commands that an SSL fixture's settings be changed, the SSL fixture responds acknowledging to the controller 30 that the command was received.

The GUI 32 provided on controller 30 (see FIGS. 1 and 2) is utilized for adjusting the settings of an SSL fixture 20 within an embodiment of the SSL system 10. The user interface program (GUI) is preferably written in the Python language, and system information and SSL fixture 20 settings are stored by the controller 30 in a file or database.

Figure 28:
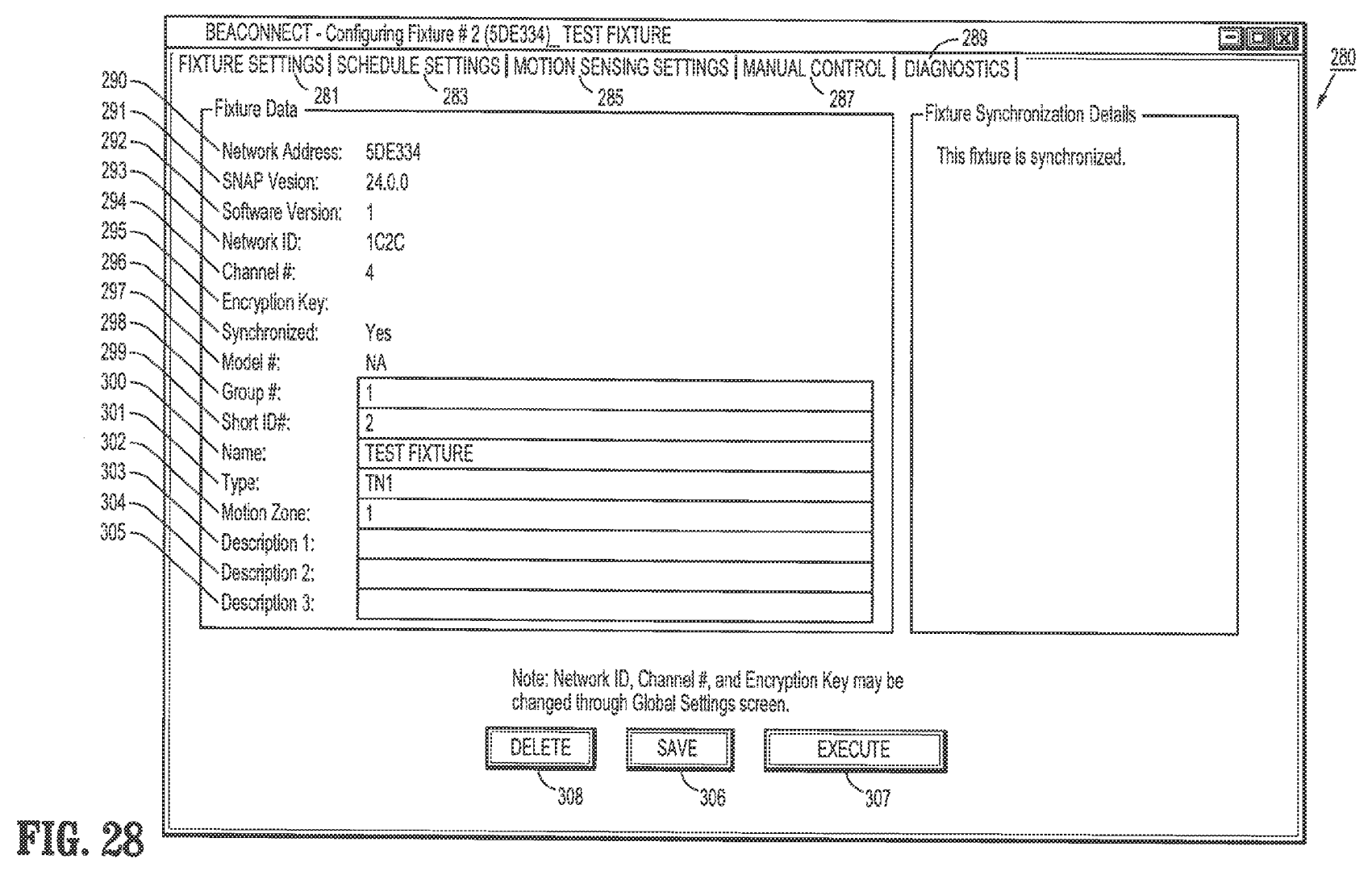

GUI 32 is represented through several screen displays provided as part of the user interface program as shown in FIGS. 27-32. FIG. 27 depicts a Detect Fixtures window 270 which allows a user to detect and identify each SSL fixture 20 and/or sensor 38 in the system. A user first inserts a USB bridge node (as described above) into their controller (e.g., laptop, tablet, smart phone, etc.) and selects a Detect Fixtures option from a menu (not shown). The user physically goes to a location in proximity to the SSL fixture(s) of interest and clicks the Detect button 277. The controller 30 will broadcast via wireless network 36 a request for SSL fixture(s) 20 and any sensors 38 within radio range to identify themselves. The broadcast transmission is preferably set for one hop so that only SSL fixtures 20 and sensors 38 directly within radio range of the controller 30 respond. Each SSL fixture within range will respond back by providing their respective ID number, such as a MAC address and, if set, the SSL fixture 20 and/or sensor's 38 names, or other information. The user interface program ranks all responses based on signal strength and displays the information to the user as seen in FIG. 27. The information, may be listed and displayed as Address 271, Name 272, Model #(if available) and Link Quality 274. Checking the Show Only Fixtures Not already on Network box 278 prior to clicking the Detect button 277 will limit the list to SSL fixtures 20 and/or sensors 38 for which controller 30 has no record. The user can then cause responding SSL fixtures 20 to flash by clicking corresponding Flash button 275. The corresponding SSL fixture 20 will flash high to low a predetermined number of times (e.g., three times) so that the user can physically identify the SSL fixture 20 corresponding to that address. Clicking Configure button 276 will display a window such as that shown in FIG. 28 depicting information corresponding to that SSL fixture 20. As shown in FIG. 28, several window tabs are provided enabling the user to perform numerous functions. The tabs include Fixture Settings tab 281, Schedule Settings tab 283, Motion Sensing Sensor Settings tab 285, Manual Control tab 287 and Diagnostics tab 289. Clicking on a tab opens a corresponding screen or window for the user.

The screen shown in FIG. 28 (Fixture Settings) is an exemplary representation of information capable of being viewed for an SSL fixture. Clicking on Configure button 276 (FIG. 27) displays the Fixture Settings screen 280 displaying information for the corresponding SSL fixture 20. The displayed information includes fixed information which cannot be modified by the user from screen 280 and user modifiable information. The fixed information includes the Network Address 290, SNAP firmware version 291, System Software Script Version 292, Network ID 293, Channel 294, Encryption Key 295, up to date synchronization status 296 and Model Number 297 which may be modified prior to the address being assigned. While not user modifiable from this window, Channel 294 and Encryption Key 295 can be modified by the user from elsewhere in the GUI. In this example, learned information about the SSL fixture 20 having a network address of 5DE334 (290) is displayed. The SSL fixture 20 is assigned to Group 1 (298) and defining a motion zone 1 (302), such that SSL fixtures within motion zone one are controlled when a zone 1 motion sensor 80 (seen in FIG. 4) or 84 (seen in FIG. 5) is activated. User modifiable information includes Group #298, Short ID #299 (a simple ID number for user convenience), Name 300, Type 301, Description 1 303, Description 2 304 and Description 3 305. Type 301 and Description 1-3 (303-305) are provided for user convenience allowing the user to enter information so that the user can readily identify the SSL fixture 20. To adjust the user modifiable information, the user overwrites the provided fields and clicks the SAVE button 306 which saves the information to the controller's 30 hard drive only. Clicking EXECUTE button 307 updates the SSL fixture with the modified information. Clicking the DELETE button 308, and clicking 'OK' in a subsequent warning dialog, completely removes the SSL fixture's entry within the user interface. If an SSL fixture is accidentally deleted, the user can return to the Detect Fixtures window 270 shown in FIG. 27 and click Detect button 277. The Tabs 283, 285, 287 and 289 provide access to those functions associated with the Fixture at the Network Address shown at 290.

Figure 29:
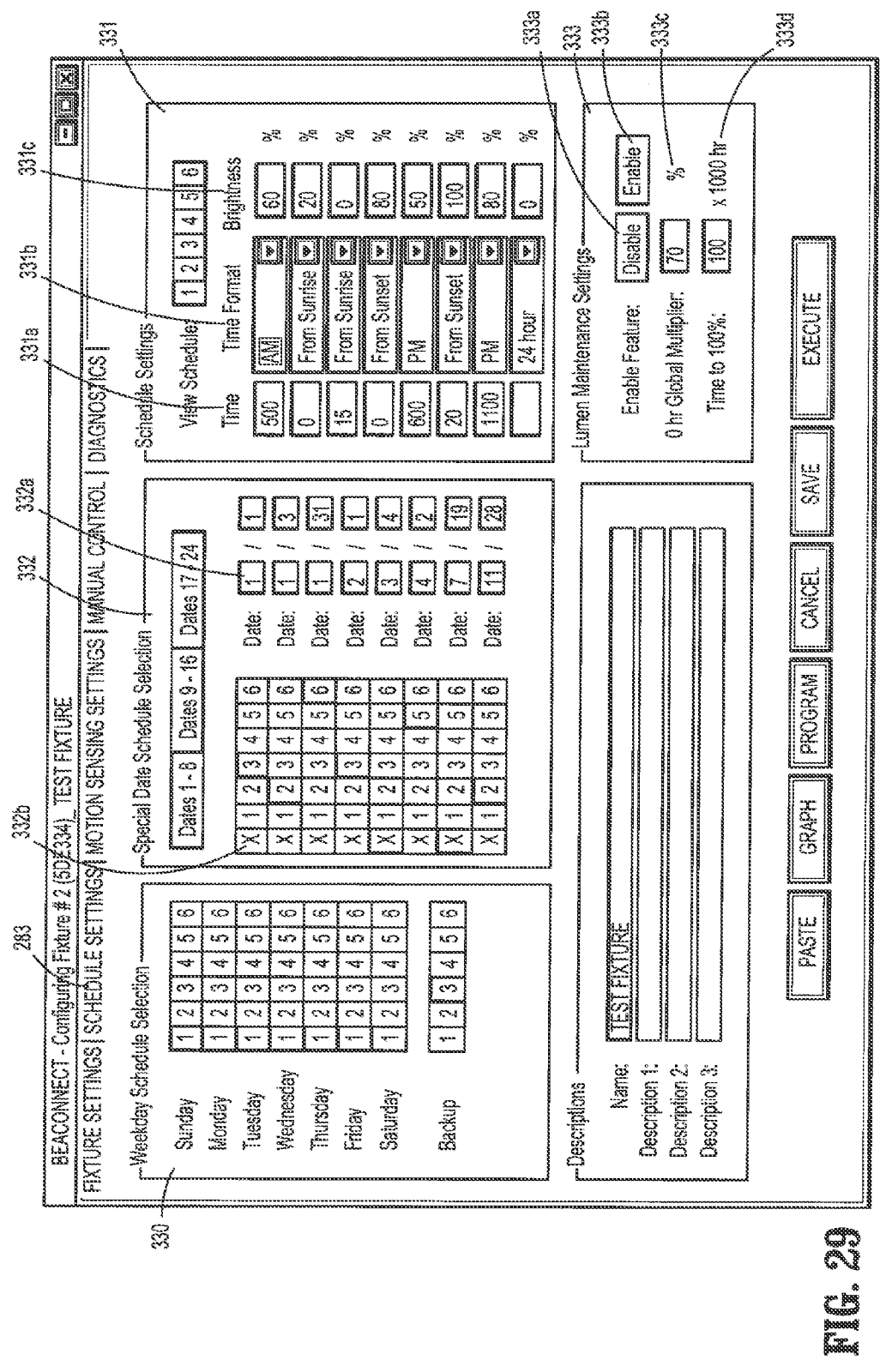

The screen shown in FIG. 29 is a Schedule Settings window 340 which allows the user to schedule a number of settings for the SSL fixture 20. If the SSL fixture 20 is associated with a group, it should be noted that although the fixture's schedule can be adjusted apart from the group, any change to the group will overwrite the individual SSL fixture settings made in this window. From this Schedule Settings window 340, the user can define up to six daily schedules. One of these schedules is applied to every weekday or special date. A schedule is also assigned as a backup in case of a RTC failure. Using Weekday Schedule Selection field 330, the user can define the daily schedule (1-6) for each day of the week by clicking one of buttons 1-6 for each day as shown. In this example, Sunday-Saturday are set for schedule 1 and backup is set for schedule 3. Clicking one of buttons 1-6 within the Schedule Settings area toggles the display between the different schedules. Each schedule can include up to 8 time events as shown in section 331 of the screen. For each time event, the user populates the Time field 331a, Time Format field 331b and Brightness (e.g., dimming level) field 331c. Clicking on a Time Format dropdown menu 331b the user is presented with several time format options including "24 Hour", "AM", "PM", "From Sunrise", and "From Sunset". Time 331a is a numerical value and generally depends on the time format chosen. For example, if "24 Hour" format is selected, time is expressed as "HHMM" (hour-hour-minute-minute) and can range from 0-2399. For "AM" or "PM" format, time is expressed as "HHMM" and can range from 100-1259. The "From Sunrise" and "From Sunset" formats define a time relative to sunrise or sunset for that day, and can range from −1200-1200. For example, −30 would indicate 30 minutes before sunrise or sunset. Values from −99-99 are interpreted directly as minutes and higher or lower values are interpreted as "HHMM" format. Brightness or dim level field 331C is a numerical value from 0 to 100, indicating the percent dimming desired for the fixture at the associated time. 100 percent indicates full power and 0 percent indicates minimum or no power. The SSL fixture 20 will execute each time event (e.g., change dimming level) at the corresponding time each day. One or more of the five Time Formats can be mixed within a schedule. However, the user should be careful when defining "From Sunrise" or "From Sunset" times that could overlap a fixed clock time as some point during the year. For example, if the SSL fixture 20 is set to dim to 50 percent at 7:00 PM, and 100 percent at sunset. If the sunset occurs at 6:00 PM, the SSL fixture 20 will go to 100 percent at 6:00 PM and then back down to 50 percent at 7:00 PM which is likely not the intended behavior. When an SSL fixture 20 is first turned on or rebooted, the SSL fixture 20 immediately executes the correct dimming level for the current time and the schedule in effect for that day. Each schedule wraps around at midnight; that is, if the current time is prior to the time of the earliest time event, the dimming level corresponding to the latest time event will apply. In this way, the scheduled dimming level is independent of the fixture's history including the previous day's schedule. Special Date Schedule Selection field 332 defines schedules to be executed on special dates. These selections will override the ordinary weekday schedules set in field 330. Up to 24 special dates can be defined. The user fills in the date field 332a (MM/DD format) and clicks on the desired schedule 332b. An entry will be ignored if the date field is left blank, or "X" is selected for the schedule. The three buttons "Dates 1-8", "Dates 9-16" and "Dates 17-24" along the top of field 332 allow the user to toggle the display between Special Dates 1-8, 9-16 and 17-24. Lumen Maintenance Settings field 333 allows the user to adjust for lumen depreciation over time. That is, lighting fixtures light output may naturally degrade over time due to a number of factors such as lamp (LED) degradation, dirt buildup, etc. The present system allows the user to compensate for these factors, by initially providing a reduced light output and gradually increasing light output as the fixture ages. The user controls this feature in field 333. Each SSL fixture 20 calculates a global multiplier based on its age, and which applies across all schedules. For example, if the calculated global multiplier is 80 percent and if the schedule in effect dictates 50 percent dimming, then the actual dimming level will be 40 percent. The user interface allows this feature to be disabled (Disable button 333a) or enabled (Enable button 333b). The "0 Hour Global Multiplier" field 333c defines the reduction in output when the SSL fixture is new. The "Time to 100%" field 333d defines the time (in thousands of hours) after which there will be no reduction in light output. Valid values are 0 to 255. If zero is entered, the "0 Hour Global Multiplier" value will be used perpetually without adjustment. Otherwise the global multiplier is recalculated every 1,000 operating hours, on a linear interpolation basis. To program the lumen maintenance to match a fixture's L-70 rating, the user can set the "0 Hour Global Multiplier" value to 70 and the "Time to 100%" field to the L-70 rating in thousands of hours.

Figure 31:
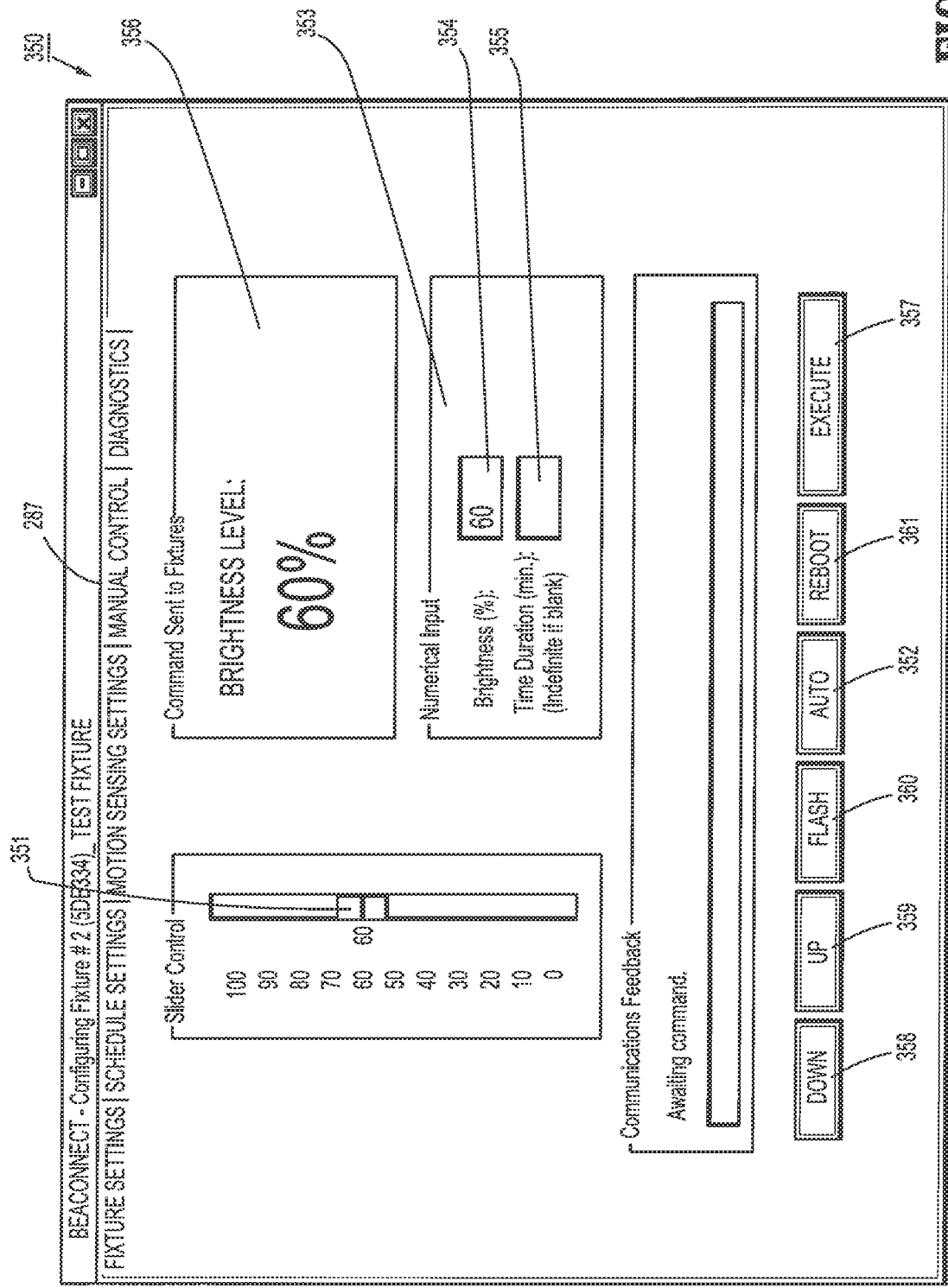
FIG. 31 is an embodiment of a screen display for configuring manual settings for a SSL fixture in the SSL system according to the present disclosure.

The screen shown in FIG. 31 is a Manual Control window 350 which allows the user to manually change dimming levels and execute other functions on an SSL fixture 20 in real time. In manual mode, users can control SSL fixtures in a timed or untimed manner. Each SSL fixture 20 will normally start up or reboot in the automatic mode and follow their programmed schedule. An SSL fixture 20 enters manual mode upon execution of any command from within the Manual Control window 350. An SSL fixture 20 returns to automatic mode after a timed manual cycle ends or when the user clicks "AUTO" button 352. The user can control dimming of an SSL fixture 20 from this window in several ways. Slider Control 351 allows the user to set the brightness level of the SSL fixture 20 from 0 percent to 100 percent. Using Numerical Input 353, the user can also enter a brightness level in box 354 as well as a time duration in box 355. If no time duration is entered, the entered brightness level will remain the same until over-ridden or the SSL fixture 20 is reboot. Upon the user clicking EXECUTE button 357, the brightness level is sent to the SSL fixture 20.

The brightness level as sent to the SSL fixture is shown in Command Sent to Fixtures frame 356. Clicking Up button 358 or Down button 359 adjusts the brightness level up or down in ten percent increments, with the brightness level being sent immediately to the SSL fixture 20 without the user having to click the Execute button 357. Clicking Reboot button 361 reboots the SSL fixture 20. Clicking Flash button 360 causes the SSL fixture to flash several times which may be useful for identifying the physical location of an installed fixture.

Figure 30:
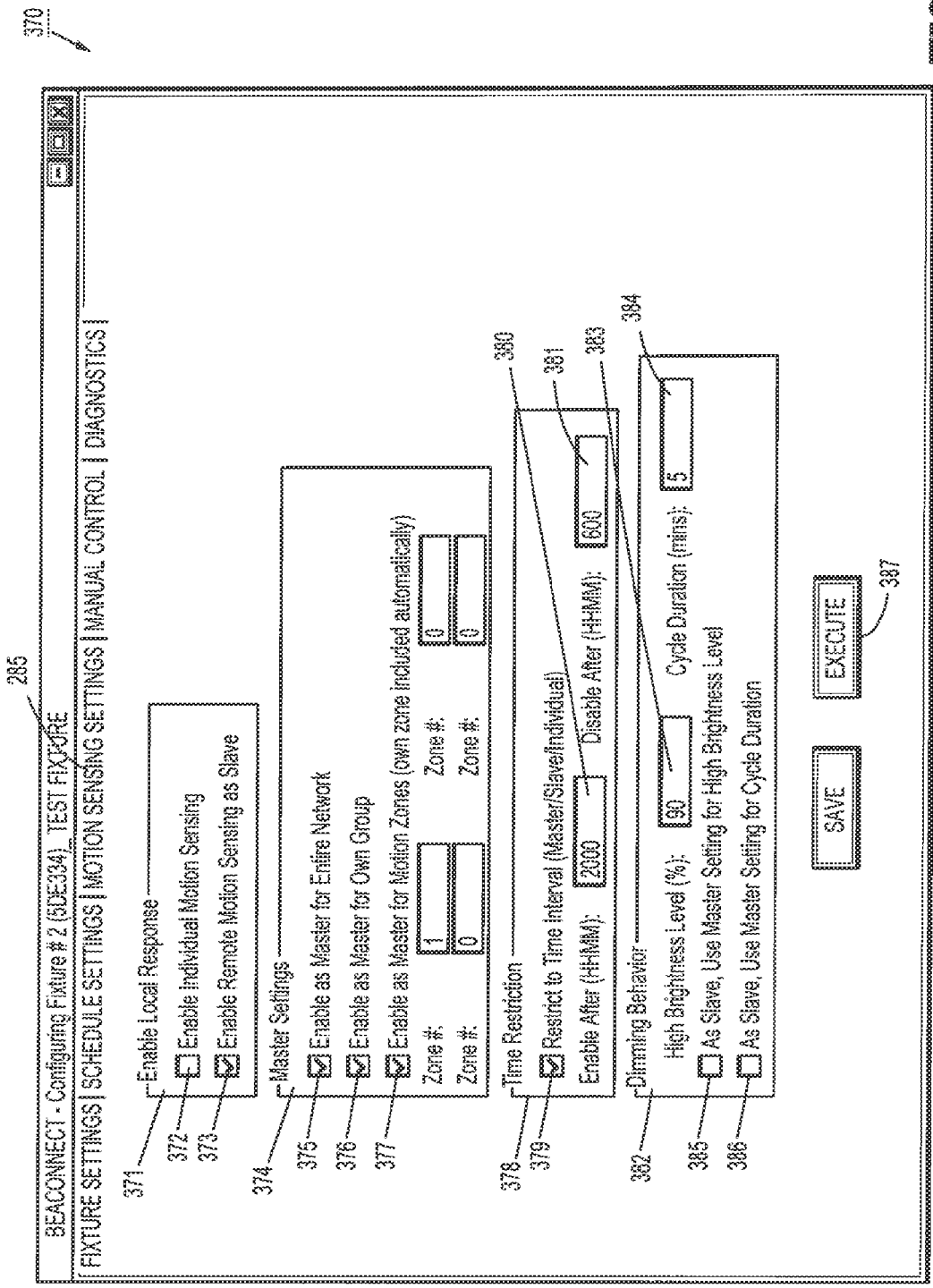
FIG. 30 is an embodiment of a screen display for configuring motion settings for a SSL fixture in the SSL system according to the present disclosure.

If a SSL fixture 20 includes a motion sensor, or if the SSL system includes an external motion sensor, the motion sensing settings can be set in accordance with the Motion Sensing Settings window 370 as shown in FIG. 30. In the preferred embodiment, this screen presents a Simple and Advanced user interface screen. The Advanced Screen encompasses all available functions and will be described. Enable Local Response field 371 allows the user to enable individual motion sensing by checking box 372 or to enable remote motion sensing as slave by checking box 373. When box 372 is checked, the SSL fixture 20 will operate utilizing its internal motion sensor. When box 373 is checked, the SSL fixture will operate as a satellite or slave utilizing a remote motion sensor which can be located internally within another SSL fixture 20 or can be a discrete motion sensor unit located external to the SSL fixture 20. Although not shown in FIG. 30, Enable Local Response Field 371 may also include fields allowing the user to set the fixture's own motion zone, set a detection sensitivity and to inhibit at a defined light level. A fixture's own motion zone defines the fixture's individual motion zone as defined later. Detection sensitivity adjusts the signal strength deemed to be an instance of motion detection for fixtures using an integral motion sensor 80. Inhibit at a light level adjusts the sensed light level at which a fixture will not respond to sensed motion for fixtures using an integral light sensor 80. Using Master Settings field 374, the SSL fixture's motion sensor can be enabled as Master for the entire network (box 375), Master for its own group (box 376) or enabled as master for motion zones (377). As shown, several motion zones may be set. In this example, zone 1 is set for this SSL fixture. This means that all SSL fixtures set with motion zone 1 are controlled utilizing the motion sensor associated with this SSL fixture. Time restrictions may also be set using Time Restriction field 378 by checking box 379. With this setting enabled, individual time intervals within the Schedule Settings window may be checked as to whether motion sensing is active in those intervals (the check boxes are not shown in FIG. 29). Alternatively, a motion sensor can be enabled after a specified time entered in field 380 and/or disabled after a specified time entered in field 381. Dimming behavior can be set in Dimming Behavior field 382. Brightness level (in percentage) can be set in field 383 and Cycle Duration (in minutes) in field 384. Checking box 385, the motion sensor can be set so that as slave (e.g., satellite), the master setting is used for high brightness. Checking box 386, the motion sensor can be set so that as slave, the master setting is used for cycle duration. Clicking Execute button 387 sends the entered information to the SSL fixture 20. Although not shown in FIG. 30, a TEST button and a SIMPLE SCREEN button may be provided. Clicking the TEST button forces the fixture 20 to respond as if it detected motion. The SIMPLE SCREEN button toggles to a Simple Screen to present a more basic control screen.

Figure 32:
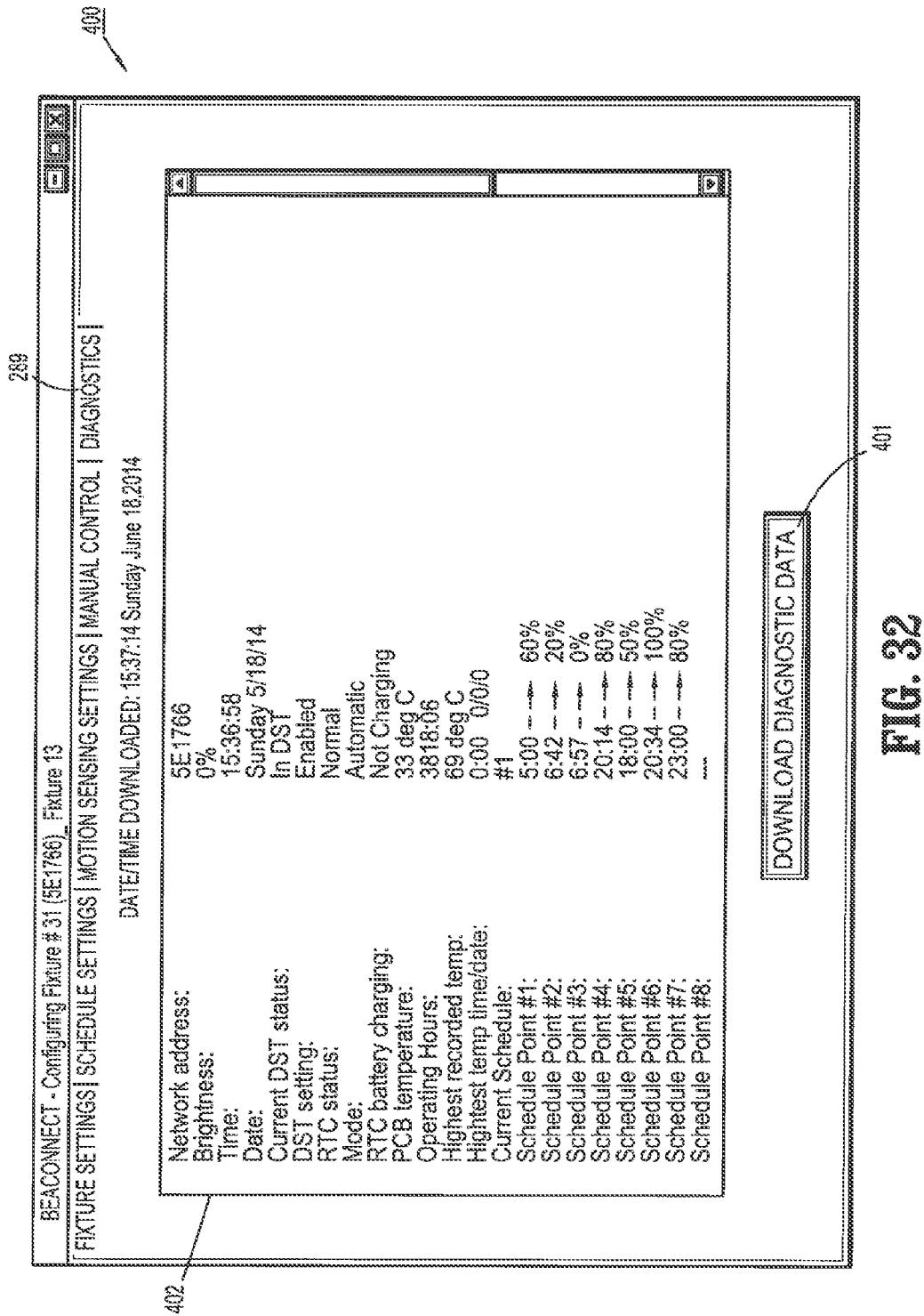
FIG. 32 is an embodiment of a screen display for analyzing diagnostic data regarding one or more SSL fixtures and the SSL system according to the present disclosure.

SSL fixtures 20 can be queried for diagnostic data from the Diagnostics window 400 shown in FIG. 32. Clicking Download Diagnostic Data button 401 retrieves diagnostic data from the SSL fixture 20. Such information can be useful to gain an understanding of energy usage, to confirm intended schedule behavior, error diagnostics, etc. Diagnostic data returned from the SSL fixture 20 is displayed in field 402. A number of diagnostic parameters can be returned by the SSL fixture 20 such as Network Address which indicates the SSL fixture's 20 ID on the network, Dimming Level as set by the schedule or manual control, Time, Date and Current Day Light Savings Time (DST) Status which indicates whether an SSL fixture 20 is currently adjusting for Daylight Savings Time. Other parameters include DST Setting indicating whether the DST feature is turned on, RTC status indicating whether errors have occurred with the real time clock and including information indicating that the time has not been set. A Mode parameter indicates whether the SSL fixture 20 is operating in Manual or Automatic mode and an RTC Battery Charging parameter indicates whether the clock's battery is currently recharging. Various temperature parameters may also be returned by the SSL fixture 20 including a PCB Temperature parameter indicating the temperature measured on the LED array's PCB, Highest Recorded Temperature indicating the highest temperature value of the PCB and Highest Temperature Time/Date indicating the date and time the highest temperature occurred. An Operating Hours parameter indicates the number of hours the SSL fixture 20 has been operating and is displayed in—HHHHHH:MM format. Current Schedule parameter identifies the schedule loaded for that day and Schedule Point [#1-#8] indicates the real time and dimming level for each scheduled time event for that day. A LifeShield Engaged parameter indicates whether is thermal protection has been engaged due to high PCB temperature and Thermal Protection Limit indicates the highest allowed dimming level, if LifeShield was engaged. Global Dimming Factor identifies the dimming multiplier set by the Lumen Maintenance settings (FIG. 29) and thermal protection. Board Config ID identifies the particular LED array being used. Link Quality is the relative strength of the last radio signal received. The voltage and drive current at the LED array may be returned as a Voltage parameter (expressed for two circuits) and a Drive Current parameter. A Power parameter may be returned indicating a present estimated fixture power consumption in Watts, based on voltage and drive current readings. An Energy Used parameter indicates the lifetime estimated energy used in kW-h. Time of Last Boot identifies when the SSL fixture 20 was last rebooted or turned on and Time of Last Time Set indicates when the RTC time was last reset. Repeater Setting indicates whether the fixture is configured as a repeater. Group indicates the fixture's current group as described earlier. Motion sensor state indicates whether an external motion sensor 84 is currently outputting high or low. The motion config ID describes the type of motion sensor circuit the fixture is equipped with. Light sensor reading indicates the light level incident on the integral light sensor 80 (if so equipped). The following (8) parameters mirror the check boxes in Sensor Settings as described above. Script version indicates the revision of the currently loaded script. Channel and Encryption Key reflect those communication settings. Although Channel and Encryption Key are not actually communicated by the fixture 20, they are added by the GUI upon successful diagnostic download (since the channel and encryption should be synchronized for successful communication).

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A Solid State Lighting fixture (SSL fixture) for illuminating a desired area, comprising:
    an SSL light engine having a plurality of SSL elements that can be activated or dimmed in response to set time and date schedules to illuminate the desired area, wherein the SSL elements comprise a plurality of LED elements arranged in series with regard to a DC power supply voltage;
    a sensor communicatively coupled to SSL, the sensor being inactive except for being active for at least one specified time interval set in accordance with the real time clock; and
    a wireless module integrated with the SSL light engine and used for communicating with a remote controller using a wireless network, wherein power for the wireless module is provided through at least one voltage regulator receiving power off of a tap between two of the LED elements.

2. The SSL fixture as recited in claim 1 wherein when the SSL elements are dimmed, the wireless module receives power from an auxiliary power source.

3. The SSL fixture as recited in claim 1, wherein the SSL light engine and the wireless module are arranged on a single printed circuit board.

4. The SSL fixture as recited in claim 1, wherein the SSL light engine is arranged on a primary circuit board and the wireless module is arranged on a secondary circuit board.

5. The SSL fixture as recited in claim 4, further comprising:
    a battery backup for supplying power to the real time clock during loss of power to the SSL fixture, wherein the real time clock maintains information including date and time information.

6. The SSL fixture as recited in claim 5, wherein the real time clock and the battery backup are arranged on the secondary circuit board.

7. The SSL fixture as recited in claim 1, further comprising a housing, wherein the SSL light engine and the wireless module are positioned within the housing for lighting a desired area.

8. The SSL fixture as recited in claim 7, wherein the sensor further comprises at least one of a photo sensor and a motion sensor.

9. The SSL fixture as recited in claim 8, wherein the at least one of the photo sensor and the motion sensor are provided within the housing.

10. The SSL fixture as recited in claim 8, wherein the at least one of the photo sensor and the motion sensor are provided external to the housing and connect to the SSL fixture via at least one interface.

11. A Solid State Lighting fixture (SSL fixture) for illuminating a desired area, comprising:
    an SSL light engine having a plurality of SSL elements that can be activated or dimmed in response to set time and date schedules to illuminate the desired area, wherein the SSL elements comprise a plurality of LED elements arranged in series with regard to a DC power supply voltage;
    a sensor communicatively coupled to SSL, the sensor being inactive except for being active for at least one specified time interval set in accordance with the real time clock; and
    a wireless module integrated with the SSL light engine and used for communicating with a remote controller using a wireless network, wherein the wireless module controls the SSL fixture in response to commands from the remote controller, and wherein power for the wireless module is provided through at least one voltage regulator receiving power off of a tap between two of the LED elements.

12. The SSL fixture as recited in claim 11, wherein the remote controller is able to remotely program the SSL fixture to set the time and date schedules via the wireless network.

13. The SSL fixture as recited in claim 11, wherein the SSL fixture is capable of operating as a repeater, wherein the wireless module retransmits commands received from the remote controller to at least one other SSL fixture via the wireless network.

14. The SSL fixture as recited in claim 13, wherein when the SSL fixture is operating as a repeater, an acknowledgement acknowledging receipt of the command from that at least one other SSL fixture is forwarded to the remote controller by the SSL fixture operating as the repeater.

15. The SSL fixture as recited in claim 11, wherein the sensor further comprises at least one of a motion sensor and a photo sensor associated with the SSL fixture, wherein the SSL fixture associated with the at least one of the motion sensor and the photo sensor controls other SSL fixtures based on signals received from the at least one motion and photo sensor.

16. The SSL fixture as recited in claim 15, wherein the at least one of the motion sensor and the photo sensor is arranged integrally with the associated SSL fixture.

17. The SSL fixture as recited in claim 15, wherein the at least one of the motion sensor and the photo sensor is arranged remote from the associated SSL fixture.

18. The SSL fixture as recited in claim 11, wherein a plurality of SSL fixtures can be arranged in a group and wherein the remote controller remotely programs the plurality of SSL fixtures to set the time and date schedules by sending one or more commands to the group via the wireless network.

* * * * *